United States Patent
Harris et al.

(10) Patent No.: US 9,644,157 B2
(45) Date of Patent: May 9, 2017

(54) METHODS AND SYSTEMS FOR UPGRADING HEAVY OIL USING CATALYTIC HYDROCRACKING AND THERMAL COKING

(75) Inventors: Everette Harris, Ivyland, PA (US); Jeffrey Gendler, Richboro, PA (US)

(73) Assignee: HEADWATERS HEAVY OIL, LLC, South Jordan, UT (US)

( * ) Notice: Subject to any disclaimer, the term of this patent is extended or adjusted under 35 U.S.C. 154(b) by 930 days.

(21) Appl. No.: 13/561,479

(22) Filed: Jul. 30, 2012

(65) Prior Publication Data
US 2014/0027344 A1     Jan. 30, 2014

(51) Int. Cl.
*C10G 69/06* (2006.01)
*B01J 37/04* (2006.01)
(Continued)

(52) U.S. Cl.
CPC .............. *C10G 69/06* (2013.01); *B01J 23/28* (2013.01); *B01J 27/043* (2013.01); *B01J 27/047* (2013.01);
(Continued)

(58) Field of Classification Search
CPC ........ C10G 9/005; C10G 47/12; C10G 69/06; C10B 55/00–55/10; C10B 57/045
See application file for complete search history.

(56) References Cited

U.S. PATENT DOCUMENTS 2,850,552 A     9/1958   Ogle
3,019,180 A *   1/1962   Schreiner, Jr. ......... C10G 51/06
                                                         208/50
(Continued)

FOREIGN PATENT DOCUMENTS

CA     2004882     6/1991
CA     2088402     7/1993
(Continued)

OTHER PUBLICATIONS

U.S. Appl. No. 14/095,698, filed Dec. 3, 2013, Lott et al.
(Continued)

*Primary Examiner* — Michelle Stein
(74) *Attorney, Agent, or Firm* — Workman Nydegger

(57) ABSTRACT

Methods and systems for hydroprocessing heavy oil feedstocks to form upgraded material use a colloidal or molecular catalyst dispersed within heavy oil feedstock, pre-coking hydrocracking reactor, separator, and coking reactor. The colloidal or molecular catalyst promotes upgrading reactions that reduce the quantity of asphaltenes or other coke forming precursors in the feedstock, increase hydrogen to carbon ratio in the upgraded material, and decrease boiling points of hydrocarbons in the upgraded material. The methods and systems can be used to upgrade vacuum tower bottoms and other low grade heavy oil feedstocks. The result is one or more of increased conversion level and yield, improved quality of upgraded hydrocarbons, reduced coke formation, reduced equipment fouling, processing of a wider range of lower quality feedstocks, and more efficient use of supported catalyst if used with the colloidal or molecular catalyst, as compared to a conventional hydrocracking process or a conventional thermal coking process.

36 Claims, 11 Drawing Sheets

(51) Int. Cl.
*B01J 37/08* (2006.01)
*B01J 37/20* (2006.01)
*B01J 23/28* (2006.01)
*B01J 27/043* (2006.01)
*B01J 27/047* (2006.01)
*B01J 27/051* (2006.01)
*B01J 35/02* (2006.01)
*B01J 35/10* (2006.01)
*C10G 47/12* (2006.01)
*C10G 9/00* (2006.01)
*C10B 55/00* (2006.01)
*C10B 57/04* (2006.01)

(52) U.S. Cl.
CPC ........ *B01J 27/051* (2013.01); *B01J 35/026* (2013.01); *B01J 35/108* (2013.01); *B01J 35/109* (2013.01); *B01J 37/04* (2013.01); *B01J 37/086* (2013.01); *B01J 37/20* (2013.01); *C10B 55/00* (2013.01); *C10B 57/045* (2013.01); *C10G 9/005* (2013.01); *C10G 47/12* (2013.01); *C10G 2300/206* (2013.01)

(56) References Cited

U.S. PATENT DOCUMENTS

| | | |
|---|---|---|
| 3,161,585 A | 12/1964 | Gleim et al. |
| 3,254,017 A | 5/1966 | Arey, Jr. et al. |
| 3,267,021 A | 8/1966 | Gould |
| 3,297,563 A | 1/1967 | Doumani |
| 3,349,713 A | 10/1967 | Fassbender |
| 3,362,972 A | 1/1968 | Kollar |
| 3,578,690 A | 5/1971 | Becker |
| 3,595,891 A | 7/1971 | Cavitt |
| 3,622,497 A | 11/1971 | Gleim |
| 3,622,498 A | 11/1971 | Stolfa et al. |
| 3,694,351 A | 9/1972 | White |
| 3,694,352 A | 9/1972 | Gleim |
| 3,816,020 A | 6/1974 | Ogles |
| 3,870,623 A | 3/1975 | Johnson et al. |
| 3,892,389 A | 7/1975 | Contastin |
| 3,915,842 A | 10/1975 | Gatsis |
| 3,919,074 A | 11/1975 | Gatsis |
| 3,953,362 A | 4/1976 | Lines et al. |
| 3,983,028 A | 9/1976 | McCollum et al. |
| 3,992,285 A | 11/1976 | Hutchings |
| 4,022,681 A | 5/1977 | Sheng et al. |
| 4,066,530 A | 1/1978 | Aldridge et al. |
| 4,066,561 A | 1/1978 | Nnadi |
| 4,067,798 A | 1/1978 | Hauschildt et al. |
| 4,067,799 A | 1/1978 | Bearden, Jr. et al. |
| 4,068,830 A | 1/1978 | Gray |
| 4,077,867 A | 3/1978 | Aldridge et al. |
| 4,083,803 A | 4/1978 | Oswald et al. |
| 4,125,455 A | 11/1978 | Herbstman |
| 4,134,825 A | 1/1979 | Bearden, Jr. et al. |
| 4,148,750 A | 4/1979 | Pine |
| 4,151,070 A | 4/1979 | Allan et al. |
| 4,178,227 A | 12/1979 | Metrailer et al. |
| 4,181,601 A | 1/1980 | Sze |
| 4,192,735 A | 3/1980 | Aldridge et al. |
| 4,196,072 A | 4/1980 | Aldridge et al. |
| 4,226,742 A | 10/1980 | Bearden, Jr. et al. |
| 4,252,634 A | 2/1981 | Khulbe et al. |
| 4,285,804 A | 8/1981 | Jacquin et al. |
| 4,298,454 A | 11/1981 | Aldridge et al. |
| 4,305,808 A | 12/1981 | Bowes |
| 4,313,818 A | 2/1982 | Aldridge et al. |
| 4,325,802 A | 4/1982 | Porter et al. |
| 4,338,183 A | 7/1982 | Gatsis |
| 4,352,729 A | 10/1982 | Jacquin et al. |
| 4,370,221 A | 1/1983 | Patmore et al. |
| 4,389,301 A | 6/1983 | Dahlberg et al. |
| 4,411,768 A | 10/1983 | Unger et al. |
| 4,420,008 A | 12/1983 | Shu |
| 4,422,927 A | 12/1983 | Kowalczyk et al. |
| 4,422,960 A | 12/1983 | Shiroto et al. |
| 4,427,532 A * | 1/1984 | Varghese ............ C10B 55/02 208/107 |
| 4,430,207 A | 2/1984 | Kukes |
| 4,435,314 A | 3/1984 | van de Leemput et al. |
| 4,452,265 A | 6/1984 | Lonnebring |
| 4,454,023 A | 6/1984 | Lutz |
| 4,455,218 A | 6/1984 | Dymock et al. |
| 4,465,630 A | 8/1984 | Akashi et al. |
| 4,467,049 A | 8/1984 | Yoshii et al. |
| 4,485,004 A | 11/1984 | Fisher et al. |
| 4,485,008 A | 11/1984 | Maa et al. |
| 4,508,616 A | 4/1985 | Larrauri et al. |
| 4,513,098 A | 4/1985 | Tsao |
| 4,551,230 A | 11/1985 | Kukes et al. |
| 4,557,823 A | 12/1985 | Kukes et al. |
| 4,557,824 A | 12/1985 | Kukes et al. |
| 4,561,964 A | 12/1985 | Singhal et al. |
| 4,564,441 A | 1/1986 | Kukes et al. |
| 4,567,156 A | 1/1986 | Bearden, Jr. et al. |
| 4,568,657 A | 2/1986 | Sepulveda et al. |
| 4,578,181 A | 3/1986 | Derouane et al. |
| 4,579,646 A | 4/1986 | Grosboll et al. |
| 4,581,344 A | 4/1986 | Ledoux et al. |
| 4,582,432 A | 4/1986 | Mehta |
| 4,585,545 A | 4/1986 | Yancey, Jr. et al. |
| 4,590,172 A | 5/1986 | Isaacs |
| 4,592,827 A | 6/1986 | Galiasso et al. |
| 4,592,830 A | 6/1986 | Howell et al. |
| 4,606,809 A | 8/1986 | Garg |
| 4,608,152 A | 8/1986 | Howell et al. |
| 4,613,427 A | 9/1986 | Sepulveda et al. |
| 4,614,726 A * | 9/1986 | Walters ................ B01J 8/087 208/164 |
| 4,626,340 A | 12/1986 | Galiasso et al. |
| 4,633,001 A | 12/1986 | Cells |
| 4,652,311 A | 3/1987 | Gulla et al. |
| 4,652,647 A | 3/1987 | Schlosberg et al. |
| 4,674,885 A | 6/1987 | Erwin et al. |
| 4,676,886 A * | 6/1987 | Rahbe ............... C10B 55/00 208/131 |
| 4,678,557 A | 7/1987 | Rodriguez et al. |
| 4,693,991 A | 9/1987 | Bjornson et al. |
| 4,695,369 A | 9/1987 | Garg et al. |
| 4,701,435 A | 10/1987 | Garcia et al. |
| 4,707,245 A | 11/1987 | Baldasarri et al. |
| 4,707,246 A | 11/1987 | Gardner et al. |
| 4,710,486 A | 12/1987 | Lopez et al. |
| 4,713,167 A | 12/1987 | Reno et al. |
| 4,716,142 A | 12/1987 | Laine et al. |
| 4,724,069 A | 2/1988 | Aldag et al. |
| 4,734,186 A | 3/1988 | Parrott et al. |
| 4,740,295 A | 4/1988 | Bearden, Jr. et al. |
| 4,746,419 A | 5/1988 | Peck et al. |
| 4,762,607 A | 8/1988 | Aldridge et al. |
| 4,762,812 A | 8/1988 | Lopez et al. |
| 4,762,814 A | 8/1988 | Parrott et al. |
| 4,764,266 A | 8/1988 | Chen et al. |
| 4,765,882 A | 8/1988 | Aldridge et al. |
| 4,770,764 A | 9/1988 | Ohtake et al. |
| 4,772,378 A | 9/1988 | Miyauchi et al. |
| 4,802,972 A | 2/1989 | Kukes et al. |
| 4,808,007 A | 2/1989 | King |
| 4,812,228 A | 3/1989 | Angevine et al. |
| 4,824,611 A | 4/1989 | Cells |
| 4,824,821 A | 4/1989 | Lopez et al. |
| 4,834,865 A | 5/1989 | Kukes et al. |
| 4,837,193 A | 6/1989 | Akizuki et al. |
| 4,851,107 A | 7/1989 | Kretschmar et al. |
| 4,851,109 A | 7/1989 | Chen et al. |
| 4,857,496 A | 8/1989 | Lopez et al. |
| 4,863,887 A | 9/1989 | Ohtake et al. |
| 4,959,140 A | 9/1990 | Kukes et al. |
| 4,963,247 A | 10/1990 | Belinko et al. |
| 4,970,190 A | 11/1990 | Lopez et al. |
| 4,983,273 A | 1/1991 | Kennedy et al. |

(56) References Cited

U.S. PATENT DOCUMENTS

| | | |
|---|---|---|
| 4,983,558 A | 1/1991 | Born et al. |
| 5,013,427 A | 5/1991 | Mosby et al. |
| 5,017,535 A | 5/1991 | Schoonhoven et al. |
| 5,017,712 A | 5/1991 | Usui et al. |
| 5,038,392 A | 8/1991 | Morris et al. |
| 5,039,392 A | 8/1991 | Bearden, Jr. et al. |
| 5,055,174 A | 10/1991 | Howell et al. |
| 5,094,991 A | 3/1992 | Lopez et al. |
| 5,108,581 A | 4/1992 | Aldridge et al. |
| 5,114,900 A | 5/1992 | King |
| 5,134,108 A | 7/1992 | Thakur et al. |
| 5,154,818 A | 10/1992 | Harandi et al. |
| 5,162,282 A | 11/1992 | Lopez et al. |
| 5,164,075 A | 11/1992 | Lopez |
| 5,166,118 A | 11/1992 | Kretschmar et al. |
| 5,171,916 A | 12/1992 | Le et al. |
| 5,178,749 A | 1/1993 | Lopez et al. |
| 5,191,131 A | 3/1993 | Takahata et al. |
| 5,254,240 A | 10/1993 | Galiasso et al. |
| 5,281,328 A | 1/1994 | Degnan, Jr. et al. |
| 5,320,500 A | 6/1994 | Cholet |
| 5,332,709 A | 7/1994 | Nappier et al. |
| 5,358,634 A | 10/1994 | Rankel |
| 5,364,524 A | 11/1994 | Partridge et al. |
| 5,372,705 A | 12/1994 | Bhattacharya et al. |
| 5,374,348 A | 12/1994 | Sears et al. |
| 5,409,595 A | 4/1995 | Harandi et al. |
| 5,435,908 A | 7/1995 | Nelson et al. |
| 5,452,954 A | 9/1995 | Handke et al. |
| 5,460,714 A | 10/1995 | Fixari et al. |
| 5,474,977 A | 12/1995 | Gatsis |
| 5,578,197 A | 11/1996 | Cyr et al. |
| 5,597,236 A | 1/1997 | Fasano |
| 5,622,616 A | 4/1997 | Porter et al. |
| 5,865,537 A | 2/1999 | Streiff et al. |
| 5,866,501 A | 2/1999 | Pradhan et al. |
| 5,868,923 A | 2/1999 | Porter et al. |
| 5,871,638 A | 2/1999 | Pradhan et al. |
| 5,913,324 A | 6/1999 | Signer |
| 5,916,432 A | 6/1999 | McFarlane et al. |
| 5,925,235 A | 7/1999 | Habib |
| 5,932,090 A | 8/1999 | Marchionna et al. |
| 5,935,419 A | 8/1999 | Khan et al. |
| 5,954,945 A | 9/1999 | Cayton et al. |
| 5,962,364 A | 10/1999 | Wilson, Jr. et al. |
| 5,972,202 A | 10/1999 | Benham et al. |
| 6,004,453 A | 12/1999 | Benham et al. |
| 6,059,957 A | 5/2000 | Khan et al. |
| 6,068,758 A | 5/2000 | Strausz |
| 6,086,749 A | 7/2000 | Kramer et al. |
| 6,090,858 A | 7/2000 | El-Sayed |
| 6,093,824 A | 7/2000 | Reichle et al. |
| 6,136,179 A | 10/2000 | Sherwood, Jr. et al. |
| 6,139,723 A | 10/2000 | Pelrine et al. |
| 6,190,542 B1 | 2/2001 | Comolliea et al. |
| 6,214,195 B1 | 4/2001 | Yadav et al. |
| 6,217,746 B1 | 4/2001 | Thakkar et al. |
| 6,239,054 B1 | 5/2001 | Shukis et al. |
| 6,270,654 B1 | 8/2001 | Colyar et al. |
| 6,274,530 B1 | 8/2001 | Cayton et al. |
| 6,277,270 B1 | 8/2001 | Morel et al. |
| 6,342,224 B1 | 1/2002 | Bruck et al. |
| 6,379,532 B1 | 4/2002 | Hoehn et al. |
| 6,454,932 B1 | 9/2002 | Baldassari et al. |
| 6,455,594 B1 | 9/2002 | Tsuji |
| 6,462,095 B1 | 10/2002 | Bonsel et al. |
| 6,550,960 B2 | 4/2003 | Catalfamo et al. |
| 6,596,155 B1 | 7/2003 | Gates et al. |
| 6,660,157 B2 | 12/2003 | Que et al. |
| 6,686,308 B2 | 2/2004 | Mao et al. |
| 6,698,917 B2 | 3/2004 | Etchells, III et al. |
| 6,712,955 B1 | 3/2004 | Hou et al. |
| 6,783,661 B1 | 8/2004 | Briot et al. |
| 6,797,153 B1 | 9/2004 | Fukuyama et al. |
| 6,884,340 B1 | 4/2005 | Bogdan |
| 6,916,762 B2 | 7/2005 | Shibuya et al. |
| 7,011,807 B2 | 3/2006 | Zhou et al. |
| 7,090,767 B2 | 8/2006 | Kaminsky et al. |
| 7,285,698 B2 | 10/2007 | Liu et al. |
| 7,449,103 B2 | 11/2008 | Lott et al. |
| 7,517,446 B2 | 4/2009 | Lott et al. |
| 7,578,928 B2 | 8/2009 | Lott et al. |
| 7,815,870 B2 | 10/2010 | Lott et al. |
| 8,142,645 B2 | 3/2012 | Zhou et al. |
| 8,309,041 B2 | 11/2012 | Lott et al. |
| 2002/0179493 A1 | 12/2002 | Etter |
| 2003/0094400 A1 | 5/2003 | Levy et al. |
| 2003/0171207 A1 | 9/2003 | Shih et al. |
| 2004/0013601 A1 | 1/2004 | Butz et al. |
| 2004/0147618 A1 | 7/2004 | Lee et al. |
| 2005/0109674 A1 | 5/2005 | Klein |
| 2005/0241991 A1 | 11/2005 | Lott et al. |
| 2005/0241992 A1 | 11/2005 | Lott et al. |
| 2005/0241993 A1 | 11/2005 | Lott et al. |
| 2005/0258073 A1 | 11/2005 | Oballa et al. |
| 2005/0279670 A1 | 12/2005 | Long et al. |
| 2006/0060501 A1 | 3/2006 | Gauthier |
| 2006/0079396 A1 | 4/2006 | Saito |
| 2006/0175229 A1 | 8/2006 | Montanari et al. |
| 2006/0201854 A1* | 9/2006 | Lott .............................. 208/108 |
| 2006/0224000 A1 | 10/2006 | Papp et al. |
| 2006/0254956 A1 | 11/2006 | Khan |
| 2006/0289340 A1 | 12/2006 | Brownscombe et al. |
| 2007/0012595 A1 | 1/2007 | Brownscombe et al. |
| 2007/0029228 A1 | 2/2007 | Aoki et al. |
| 2007/0108100 A1 | 5/2007 | Satchell, Jr. |
| 2007/0131587 A1 | 6/2007 | Fukuyama et al. |
| 2007/0138059 A1 | 6/2007 | Farshid et al. |
| 2007/0158236 A1 | 7/2007 | Zhou et al. |
| 2007/0158238 A1 | 7/2007 | Wu et al. |
| 2007/0158239 A1 | 7/2007 | Satchell |
| 2007/0163921 A1 | 7/2007 | Keusenkothen et al. |
| 2007/0175797 A1 | 8/2007 | Iki et al. |
| 2007/0209965 A1 | 9/2007 | Duddy et al. |
| 2009/0107881 A1 | 4/2009 | Lott et al. |
| 2009/0152165 A1* | 6/2009 | Etter .................... C10G 9/005 |
| | | 208/55 |
| 2009/0159505 A1 | 6/2009 | Da Costa et al. |
| 2009/0310435 A1 | 12/2009 | Lott et al. |
| 2010/0065472 A1 | 3/2010 | Chabot |
| 2010/0122931 A1* | 5/2010 | Zimmerman et al. .......... 208/50 |
| 2010/0294701 A1 | 11/2010 | Lott et al. |
| 2011/0017637 A1 | 1/2011 | Reynolds et al. |
| 2011/0017641 A1 | 1/2011 | Gupta et al. |
| 2013/0068658 A1 | 3/2013 | Lott et al. |
| 2013/0075304 A1 | 3/2013 | Chang et al. |

FOREIGN PATENT DOCUMENTS

| | | |
|---|---|---|
| CA | 2579528 | 9/2007 |
| CN | 1295112 | 5/2001 |
| CN | 1966618 | 5/2007 |
| DE | 2324441 | 12/1973 |
| DE | 2315114 | 10/1974 |
| DE | 2421934 | 11/1974 |
| EP | 0199399 | 10/1986 |
| EP | 0 546 686 | 6/1993 |
| EP | 0559399 | 9/1993 |
| EP | 1043069 | 10/2000 |
| EP | 1753846 | 2/2007 |
| GB | 1047698 | 8/1963 |
| JP | Sho47-014205 | 10/1972 |
| JP | Sho59108091 | 6/1984 |
| JP | Sho5950276 | 12/1984 |
| JP | 60-044587 | 3/1985 |
| JP | Sho62039634 | 8/1987 |
| JP | Sho6327596 | 2/1988 |
| JP | 01-165692 | 6/1989 |
| JP | 2863858 | 2/1990 |
| JP | Hei 5-501829 | 4/1993 |
| JP | Hei 06-009966 | 1/1994 |
| JP | 6287574 | 10/1994 |
| JP | 06346064 | 12/1994 |
| JP | 07-062355 | 3/1995 |

(56) References Cited

FOREIGN PATENT DOCUMENTS

| | | |
|---|---|---|
| JP | Hei07090282 | 4/1995 |
| JP | 08-325580 | 12/1996 |
| JP | 2003193074 | 7/2003 |
| WO | WO 97/23582 | 12/1996 |
| WO | WO 97/34967 | 3/1997 |
| WO | WO 00/75336 | 12/2000 |
| WO | WO 01/01408 | 1/2001 |
| WO | WO 01/41799 | 6/2001 |
| WO | WO2005104749 | 11/2005 |
| WO | WO 2006/116913 | 11/2006 |
| WO | WO2006116913 | 11/2006 |
| WO | WO2007078622 | 7/2007 |
| WO | WO2007106783 | 9/2007 |
| WO | 2009-058785 | 5/2009 |

OTHER PUBLICATIONS

U.S. Appl. No. 13/866,220, Jun. 28, 2013, Office Action.
U.S. Appl. No. 13/866,220, Nov. 13, 2006, Notice of Allowance.
U.S. Appl. No. 13/675,629, Jun. 14, 2013, Notice of Allowance.
U.S. Appl. No. 13/113,722, filed May 23, 2011, Lott et al.
U.S. Appl. No. 13/116,195, filed May 26, 2011, Lott et al.
Alberto Del Bianco et al., "Upgrading Heavy Oil Using Slurry Processes," Chemtech, Nov. 30, 1995 (Nov. 30, 1995), pp. 35-43.
Aspen Hydrocracker™: A simulation system for monitoring, planning and optimizing hydrocracking and hydrotreating units, www.aspentec.com/brochures/hydrocracker.pdf (2001).
Criterion: Hydrocracking Process Description and CRITERION/ZEOLYST Hydrocracking Catalyst Applications, www.criterioncatalysts.com (2001).
Database CA [online] Chemical Abstracts Service retrieved from STN Database accession No. 1991:42412.
"Hydrocracking of Liaohe Vacuum Residue With Bimeta": Shen et al., Preprints of Symposia—American Chemical society, Division of Fuel Chemistry (1998), 43(3), 481-485, OCDEN: Psadfz, 1998, XP009117504.
"HYVAHL, Significantly Improved RFCC Performance or Low Sulfur Fuel Oils Via Residue Hydrotreatment," Axens IPF Group Technologies, pp. 1,2 (Jan. 2003).
Lewis, Richard J., Hawley's Condensed Chemical Dictionary, 15 Edition, 2007, p. 321.
Molecular Profile Report, Cobalt Benzoate, http://chemfindercambridgesoft.com/chembiofinder/forms/search/contentarea/chembiovizsearch.aspx?formgroupid=8
&appname=chembiofinder&allowfullsearch=true
&keeprecordcountsynchronized-flase
&searchcriteraid=47searchcriteravalue=932-69-4&currentindex=0.
N. Panariti et al.: "Petroleum Residue Upgrading with Dispersed Catalysts Part 1. Catalysts Activity and Selectivity" Applied Catalysts A: General, vol. 204, Mar. 31, 2000 (Mar. 1, 2000) pp. 203-213.
OCR Moving Bed Technology for the future, pp. 1-2 (at least as early as 2004).
Papaioannou et al., "Alkali-Metal- and Alkaline-Earth-Promoted Catalysts for Coal Liquefaction Applications", Energy & Fuels, vol. 4, No. 1, pp. 38-42 (1990).
"Petroleum Residue Upgrading with Dispersed Catalysts Part 2. Effect of Operating Conditions," Applied Catalysts A: General, vol. 204, Mar. 31, 2000 (Mar. 1, 2000) pp. 215-222.

Plain et al., "Options for Resid Conversion", Axens IFP Group Technologies, pp. 1-10 (at least as early as 2004).
Roger K. Lott et al.: "(HC)3 Process—A Slurry Hydrocracking Technology Designed to Convert Bottoms of Heavy Oils" 7th UNITAR International Conference of Heavy Crude and Tar Sands, Beijing, Oct. 27, 1998 (Oct. 27, 1998) pp. 1-8.
Santori, R., et al., "Eni Slurry Technology: A Technology to Convert the Bottom of the Barrel to Transportation Fuels", 3rd Bottom of the Barrell Technology Conference & Exhibition (Oct. 2004).
Seader et al., "Perry's Chemical Engineers' Handbook", 7th Edition, Section 13—Distillation, 1997, 13-25.
U.S. Appl. No. 12/838,761, Nov. 26, 2010, Office Action.
U.S. Appl. No. 12/838,761, May 18, 2011, Office Action.
U.S. Appl. No. 12/838,761, Jul. 20, 2012, Office Action.
U.S. Appl. No. 11/117,262, Feb. 4, 2008, Office Action.
U.S. Appl. No. 11/117,262, Jul. 17, 2008, Office Action.
U.S. Appl. No. 11/117,262, Dec. 5, 2008, Office Action.
U.S. Appl. No. 11/117,262, Apr. 30, 2009, Notice of Allowance.
U.S. Appl. No. 11/117,262, Jan. 26, 2009, Notice of Allowance.
U.S. Appl. No. 11/117,203, Jul. 10, 2008, Office Action.
U.S. Appl. No. 11/117,203, Dec. 10, 2008, Notice of Allowance.
U.S. Appl. No. 11/117,202, Apr. 29, 2008, Office Action.
U.S. Appl. No. 11/117,202, Aug. 18, 2008, Notice of Allowance.
U.S. Appl. No. 13/116,195, Jan. 12, 2012, Office Action.
U.S. Appl. No. 13/116,195, Jul. 11, 2012, Notice of Allowance.
U.S. Appl. No. 12/106,112, Jan. 26, 2010, Office Action.
U.S. Appl. No. 12/106,112, Jun. 22, 2010, Notice of Allowance.
U.S. Appl. No. 13/113,722, Aug. 8, 2012, Office Action.
U.S. Appl. No. 13/866,220, filed Apr. 19, 2013, Lott et al.
U.S. Appl. No. 13/865,726, filed Apr. 19, 2013, Lott et al.
U.S. Appl. No. 12/547,278, Dec. 29, 2011, Office Action.
U.S. Appl. No. 12/547,278, Sep. 7, 2012, Office Action.
U.S. Appl. No. 13/236,209, Sep. 19, 2011, Office Action.
U.S. Appl. No. 13/236,209, Jul. 11, 2012, Notice of Allowance.
U.S. Appl. No. 13/675,629, Feb. 7, 2013, Office Action.
U.S. Appl. No. 12/838,761, Jan. 10, 2013, Notice of Allowance.
U.S. Appl. No. 13/113,722, Jan. 22, 2013, Notice of Allowance.
U.S. Appl. No. 14/836,792, filed Aug. 26, 2015, Harris et al.
U.S. Appl. No. 11/374,369, May 28, 2009, Office Action.
U.S. Appl. No. 11/117,262, Jun. 26, 2009, Notice of Allowance.
U.S. Appl. No. 11/932,201, Nov. 23, 2009, Office Action.
U.S. Appl. No. 11/374,369, Mar. 18, 2010, Final Office Action.
U.S. Appl. No. 11/932,201, May 13, 2010, Final Office Action.
U.S. Appl. No. 11/968,934, Sep. 20, 2010, Office Action.
U.S. Appl. No. 11/968,934, Jan. 25, 2011, Office Action.
U.S. Appl. No. 11/932,201, Apr. 21, 2011, Notice of Allowance.
U.S. Appl. No. 11/932,201, Jun. 8, 2011, Supplemental Notice of Allowance.
U.S. Appl. No. 11/968,934, Jul. 13, 2011, Final Office Action.
U.S. Appl. No. 11/968,934, Jan. 6, 2012, Notice of Allowance.
U.S. Appl. No. 13/236,209, Feb. 1, 2012, Office Action.
U.S. Appl. No. 11/374,369, Mar. 12, 2014, Office Action.
U.S. Appl. No. 12/547,278, Apr. 22, 2014, Office Action.
U.S. Appl. No. 13/242,979, Aug. 21, 2014, Office Action.
U.S. Appl. No. 11/374,369, Aug. 28, 2014, Final Office Action.
U.S. Appl. No. 12/547,278, Nov. 24, 2014, Final Office Action.
U.S. Appl. No. 13/242,979, Mar. 12, 2015, Final Office Action.
U.S. Appl. No. 13/865,726, May 12, 2015, Office Action.
U.S. Appl. No. 13/865,726, Jan. 11, 2016, Final Office Action.
U.S. Appl. No. 11/374,369, May 18, 2016, Office Action.

* cited by examiner

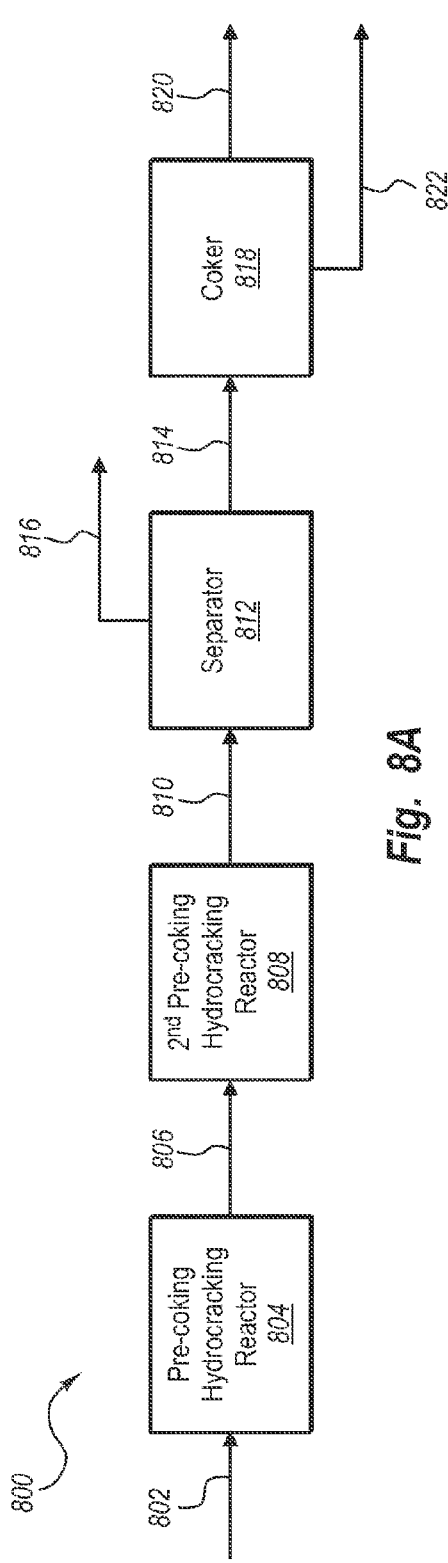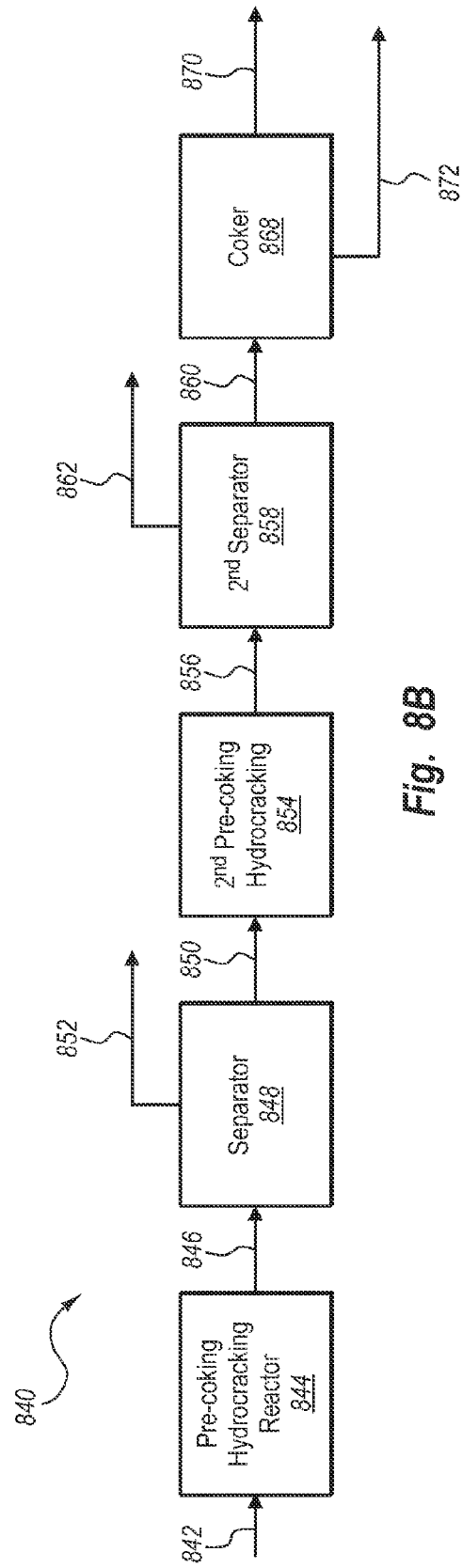

METHODS AND SYSTEMS FOR UPGRADING HEAVY OIL USING CATALYTIC HYDROCRACKING AND THERMAL COKING

BACKGROUND OF THE INVENTION

1. The Field of Invention

The present invention is in the field of upgrading hydrocarbon feedstocks that include a significant quantity of asphaltenes and hydrocarbons having a boiling point above 524° C. (975° F.) into lower boiling, higher quality materials.

2. The Relevant Technology

World demand for refined fossil fuels is ever-increasing and will inevitably outstrip the supply of high quality crude oil, whether as a result of actual shortages or due to the actions of oil cartels. In either case, as the price or shortage of crude oil increases there will be increasing demand for ways to better exploit lower quality feedstocks and extract fuel values therefrom. As more economical ways to process lower quality feedstocks become available, such feedstocks may possibly catch, or even surpass, higher quality crude oils as the primary source of refined fossil fuels for operating automobiles, trucks, farm equipment, aircraft, and other vehicles that rely on internal combustion.

Low quality feedstocks include relatively high quantities of hydrocarbons that have a boiling point of 524° C. (975° F.) or higher. They also contain relatively high concentrations of sulfur, nitrogen and metals. High boiling fractions typically have a high molecular weight and/or low hydrogen/carbon ratio and include complex compounds collectively referred to as "asphaltenes". Asphaltenes are difficult to process and commonly cause fouling of conventional catalysts and hydroprocessing equipment.

Examples of lower quality feedstocks that contain relatively high concentrations of asphaltenes, sulfur, nitrogen and metals include heavy oil and oil sands bitumen, as well as bottom of the barrel and residuum left over from conventional refinery process (collectively "heavy oil"). The terms "bottom of the barrel" and "residuum" (or "resid") typically refer to atmospheric tower bottoms, which have a boiling point of at least 343° C. (650° F.), or vacuum tower bottoms, which have a boiling point of at least 524° C. (975° F.). The terms "resid pitch", "vacuum residue" and "vacuum reduced crude" (VRC) are commonly used to refer to fractions that have a boiling point of at least 524° C. (975° F.).

By way of comparison, Alberta light crude contains about 9% by volume vacuum residue, while Lloydminster heavy oil contains about 41% by volume vacuum residue, Cold Lake bitumen contains about 50% by volume vacuum residue, and Athabasca bitumen contains about 51% by volume vacuum residue. Resid contains even higher concentrations of fractions that boil at or above about 343° C. (650° F.), with vacuum tower bottoms almost exclusively comprising fractions that boil at or above about 524° C. (975° F.).

In conventional petroleum refining processes, crude oil typically is fractionated by an atmospheric distillation tower, producing fractions with different boiling points, including: gases, light naphtha, heavy naphtha, jet fuel, kerosene, diesel oil, atmospheric gas oil, and atmospheric bottoms (or atmospheric reduced crude). Among these products, gases undergo gas processing that eventually yields products including fuel, butanes, liquefied petroleum gas (LPG), and the like. The most commercially valuable fractions are the lower boiling liquid fractions, which undergo further hydroprocessing, including hydrocracking and hydrotreating, to yield gasoline blending products, jet fuel, kerosene, and diesel oil. The highest boiling fractions, atmospheric bottoms, are further fractionated by a vacuum distillation tower, producing fractions with increasing boiling points including: gas, light vacuum gas oil, heavy vacuum gas oil, vacuum residuum (or vacuum reduced crude), and asphalt. Light vacuum gas oil and heavy vacuum gas oil are further processed to yield gasoline blending products, while vacuum residuum is typically further processed by a coker, i.e., a system that reforms high boiling heavy oil (typically vacuum residuum) by thermal cracking, forming upgraded hydrocarbons and coke.

Coking is a thermal cracking process used in oil refineries to upgrade and convert petroleum residuum (bottoms from atmospheric and vacuum distillation of crude oil) into liquid and gas product streams, leaving behind a solid concentrated carbon material, petroleum coke. Coking products include gas, coker naphtha, coker gas oil, and petroleum coke, among which coker naphtha and coker gas oil are the more commercially valuable fractions, and can be further processed to yield kerosene, diesel, and gasoline blending products. According to the structure of petroleum coke, coke products include needle coke, sponge coke, shot coke, and anode grade coke.

Converting heavy oil into useful end products requires extensive processing, including reducing the boiling point of the heavy oil, increasing the hydrogen-to-carbon ratio, and removing impurities such as metals, sulfur, nitrogen and high carbon forming compounds. Examples of catalytic hydrocracking processes using conventional supported catalysts to upgrade atmospheric tower bottoms include slurry bed hydroprocessing that utilizes fine solid catalyst particles, fixed-bed hydroprocessing that utilizes a solid heterogeneous catalyst, ebullated- or expanded-bed hydroprocesing that utilizes a solid heterogeneous catalyst, and moving-bed hydroprocesing that utilizes a solid heterogeneous catalyst and is a version of fixed bed hydroprocesing. Non-catalytic processes used to upgrade vacuum tower bottoms include thermal cracking, such as residual oil coking (for which several commercial processes exist including delayed coking, fluid coking and ExxonMobil's proprietary Flexicoking® process), and solvent extraction. Solvent extraction is quite expensive and incapable of reducing the boiling point of the heavy oil. Conventional catalytic hydrocracking processes often involve rapid catalyst sintering, fouling, and deactivation and high catalyst cost, making them currently unsuitable for hydroprocessing vacuum tower bottoms unless substantially diluted with lower boiling fractions, such as atmospheric tower bottoms. Even with dilution of the lower boiling fractions, most existing ebullated bed processes operate at less than 65 wt % conversion, while most fixed bed processes have less than about 25 wt % conversion. Coking currently is the primary commercial method to upgrade vacuum reduced crude, but conventional coking processes typically are associated with low conversion rate, high risks of coking and fouling of equipment, extensive decoking time, and high decoking water and energy consumption.

When coke is formed in hydroprocessing processes other than coking, it tends to foul equipment and deactivate the reactor and catalyst, requiring extensive maintenance, expensive repairs and increased catalyst. Even when coke is formed in a coking process, it requires decoking using high pressure water and steam in a coking reactor, which consumes substantial time, energy, space, and water. Coking also tends to cause clogging and fouling within the coking system other than the coking reactor (e.g. furnace, resid feed line, filter, coking fractionator, and feed line).

Exacerbating the relatively low conversion levels using existing hydroprocessing systems is the inability to proportionally convert the asphaltene fraction at the same conversion level as the heavy oil as a whole. The result of disproportional conversion is progressive buildup of asphaltenes in the processed feedstock, with an attendant increase in the likelihood that coke and sediment will form in the reactor and other processing equipment. Apart from equipment fouling, coke and sediments can lead to instability of residual resid when used as a fuel oil.

In view of the foregoing, there is an ongoing but unsatisfied need to develop improved hydroprocessing methods and systems that can be used at a commercial level to upgrade heavy oil feedstocks. There is also an unsatisfied need to develop hydroprocessing methods and systems that can be used to upgrade vacuum tower bottoms and other low grade heavy oil feedstocks, increasing the production of upgraded liquid hydrocarbon products while reducing the formation of coke.

SUMMARY OF THE INVENTION

The present invention relates to hydroprocessing methods and systems for upgrading heavy oil by combining a hydrocracking process that utilizes a colloidal or molecular catalyst with a coking process. When used together, the two processes increase overall conversion of high boiling fractions into lower boiling fractions and increase C4+ distillate yields.

The methods and systems involve the use of a colloidal or molecular catalyst dispersed within a heavy oil feedstock, a pre-coking hydrocracking reactor, and a coking reactor. The colloidal or molecular catalyst is preferentially associated with asphaltenes and other coke forming precursors within the heavy oil feedstock, promoting upgrading reactions that reduce the quantity of asphaltenes or other coke forming precursors, increase the hydrogen to carbon ratio in the upgraded material, decrease the boiling points of hydrocarbons in the upgraded material, increase yield and conversion rate, improve the quality of the upgraded liquid hydrocarbon products, and reduce formation of coke. The methods and systems can be used to upgrade vacuum tower bottoms and other low grade heavy oil feedstocks.

Conventional coking is the primary commercial method to upgrade vacuum reduced crude because most conventional hydrocracking processes are unsuitable for processing asphaltenes and other coke forming precursors. Instead of directly introducing vacuum reduced crude into a coker, the present invention first upgrades the vacuum reduced crude or other heavy oil feedstock in a pre-coking reactor with colloidal-sized particles or molecules of a hydroprocessing catalyst dispersed throughout the feedstock, a significant portion of the catalyst being associated with asphaltene molecules present in the feedstock. As the asphaltene molecules form free radicals under hydrocracking temperature, the closely associated colloidal or molecular catalyst catalyzes a reaction between the asphaltene radicals and hydrogen, thereby preferentially promoting beneficial upgrading reactions to form smaller hydrocarbon molecules instead of forming coke and sediment. As a result, the asphaltene fraction found in heavy oil feedstocks can be upgraded into more usable materials along with the other hydrocarbons in the feedstock rather than simply being a coke and sediment precursor that is, at best, a low-value product in the coking process, or, at worst, a detrimental byproduct that can quickly deactivate the catalyst and/or foul the processing equipment, requiring substantially greater quantities of catalyst and/or costly shut downs and clean-up operations.

The present invention can increase the formation of upgraded liquid hydrocarbons in the coker and reduce formation of coke. This advantage also reduces the frequency of online-offline coking-decoking cycles of coker drums in delayed coking, which require repeated shut down, decoking with high pressure steam and water, and high temperature and pressure cyclings. The lower decoking frequency greatly increases equipment operating life and reduces operation cost.

One aspect of the present invention involves a method for hydroprocessing a heavy oil feedstock to reduce coke formation and increase production of upgraded liquid hydrocarbon products, comprising: (1) preparing a heavy oil feedstock comprised of a substantial quantity of hydrocarbons having a boiling point greater than about 343° C., including asphaltenes or other coke forming precursors, and a colloidal or molecular catalyst dispersed throughout the heavy oil feedstock; (2) introducing hydrogen and the heavy oil feedstock with the colloidal or molecular catalyst into a pre-coking hydrocracking reactor; (3) heating or maintaining the heavy oil feedstock at a hydrocracking temperature to form hydrocarbon free radicals from the heavy oil feedstock, the colloidal or molecular catalyst catalyzing upgrading reactions between hydrogen and the hydrocarbon free radicals to yield an upgraded material, the upgrading reactions reducing the quantity of asphaltenes or other coke forming precursors, increasing the hydrogen to carbon ratio in the upgraded material, and decreasing the boiling points of hydrocarbons in the upgraded material compared to the heavy oil feedstock; (4) transferring the upgraded material, together with residual colloidal or molecular catalyst and hydrogen, to a separator to separate gaseous and volatile fractions from a liquid hydrocarbon fraction, the residual colloidal or molecular catalyst being dispersed in the liquid hydrocarbon fraction; (5) introducing at least a portion of the liquid hydrocarbon fraction into one or more coking reactors, causing thermal-cracking of the liquid hydrocarbon fraction to form coke and upgraded hydrocarbon products; and (6) separating the coke from the upgraded hydrocarbon products.

Another aspect of the invention involves a hydroprocessing system for hydroprocessing a heavy oil feedstock to form coke and upgraded hydrocarbon products, comprising: (1) a heavy oil feedstock comprised of a substantial quantity of hydrocarbons having a boiling point greater than about 343° C. and a colloidal or molecular catalyst dispersed throughout the feedstock; (2) a pre-coking hydrocracking reactor that heats or maintains the heavy oil feedstock at a hydrocracking temperature together with hydrogen during use in order to convert at least a portion of higher boiling hydrocarbons in the heavy oil feedstock to lower boiling hydrocarbons and thereby form an upgraded material, the pre-coking hydrocracking reactor comprised of (i) an inlet port at a bottom of the reactor into which the heavy oil feedstock and hydrogen are introduced and (ii) an outlet port at a top of the reactor from which the upgraded material, colloidal or molecular catalyst, and hydrogen are withdrawn; (3) a separator that separates gaseous and volatile fractions from a higher boiling liquid hydrocarbon fraction in the upgraded material, the separator comprised of (i) an inlet through which the upgraded material is introduced into the separator, (ii) a first outlet through which the gaseous and volatile fractions are withdrawn, and (iii) a second outlet through which the liquid hydrocarbon fraction is withdrawn; and (4) one or more coking reactors configured to receive and process the liquid hydrocarbon fraction, the one or more coking reactors being thermal coking reactors, such as residual oil coking. Examples of commercially available coking processes which are suitable for this invention are delayed coking, fluid coking, and the ExxonMobil Flexicoking® processes.

A guard bed may optionally be used in the foregoing methods and systems to remove metals from the liquid hydrocarbon fraction produced by the pre-coking reactor before introducing the liquid hydrocarbon fraction into the coking reactor in order to improve the quality of the resulting petroleum coke. The guard bed contains a solid supported catalyst for hydroprocesing the liquid hydrocarbon fraction, wherein the solid supported catalyst removes at least a portion of the residual colloidal or molecular catalyst and metal contaminants from the liquid hydrocarbon fraction.

The colloidal or molecular catalyst used within the method and systems according to the invention is typically formed in situ within the heavy oil feedstock prior to, or upon commencing, hydroprocessing of the feedstock. According to one embodiment, an oil soluble catalyst precursor comprising an organo-metallic compound or complex is blended with the heavy oil feedstock containing sulfur bearing molecules and thoroughly mixed in order to achieve a very high dispersion of the precursor within the feedstock prior to formation of the catalyst. Catalyst precursors may include catalytic metals such as Mo, Ni, Co, W, Fe, V and combinations thereof. Ligands for the metals can include 2-ethyl hexanoate, naphthanate, octoate, hexacarbonyl, pentacarbonyl, 3-cyclopentylpropionate, cyclohexanebutyric acid, biphenyl-2-carboxylic acid, 4-heptylbenzoic acid, 5-phenylvaleric acid, geranic acid, 10-undecenoic acid, dodecanoic acid, octanoic acid, 2-ethylhexanoic acid, naphthanic acid, pentacarbonyl, hexacarbonyl, and the like. An exemplary catalyst precursor is a molybdenum 2-ethylhexanoate complex containing approximately 15% by weight molybdenum. Another exemplary catalyst precursor is a molybdenum 3-cyclopentylpropionate complex containing approximately 15% by weight molybdenum.

In order to ensure thorough mixing of the catalyst precursor within the feedstock, the catalyst precursor is preferably pre-blended with a hydrocarbon oil diluent (e.g., vacuum gas oil, decant oil, cycle oil, or light gas oil) to create a diluted precursor mixture, which is thereafter blended with the heavy oil feedstock. The decomposition temperature of the catalyst precursor is selected so as to be sufficiently high so that the catalyst precursor resists premature decomposition before intimate mixing of the catalyst precursor within the feedstock. Subsequent heating of the feedstock to a temperature sufficient to decompose the catalyst precursor and cause the release of hydrogen sulfide from sulfur-bearing hydrocarbon molecules, either before or upon commencing hydroprocessing, causes the catalyst precursor that has been intimately mixed with the feedstock to yield individual metal sulfide catalyst molecules and/or extremely small particles that are colloidal in size (i.e., less than about 500 nm, preferably less than about 100 nm, more preferably less than about 10 nm, even more preferably less than about 5 nm, and most preferably less than about 1 nm).

The benefits resulting from the foregoing methods and systems include increased conversion level and upgraded hydrocarbon yield and quality, reduced coke formation, lowered decoking frequency, decreased energy and water consumption, reduced equipment fouling, a wider range of upgradable feedstocks, and more efficient use of supported catalyst if used in combination with the colloidal or molecular catalyst, as compared to conventional hydrocracking and coking processes.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which:

FIGS. 8A and 8B are block diagrams that schematically illustrate alternative exemplary embodiments of hydroprocessing systems according to the invention for upgrading a heavy oil feedstock;

DETAILED DESCRIPTION OF THE PREFERRED EMBODIMENTS

I. Introduction and Definitions

Figure 1:
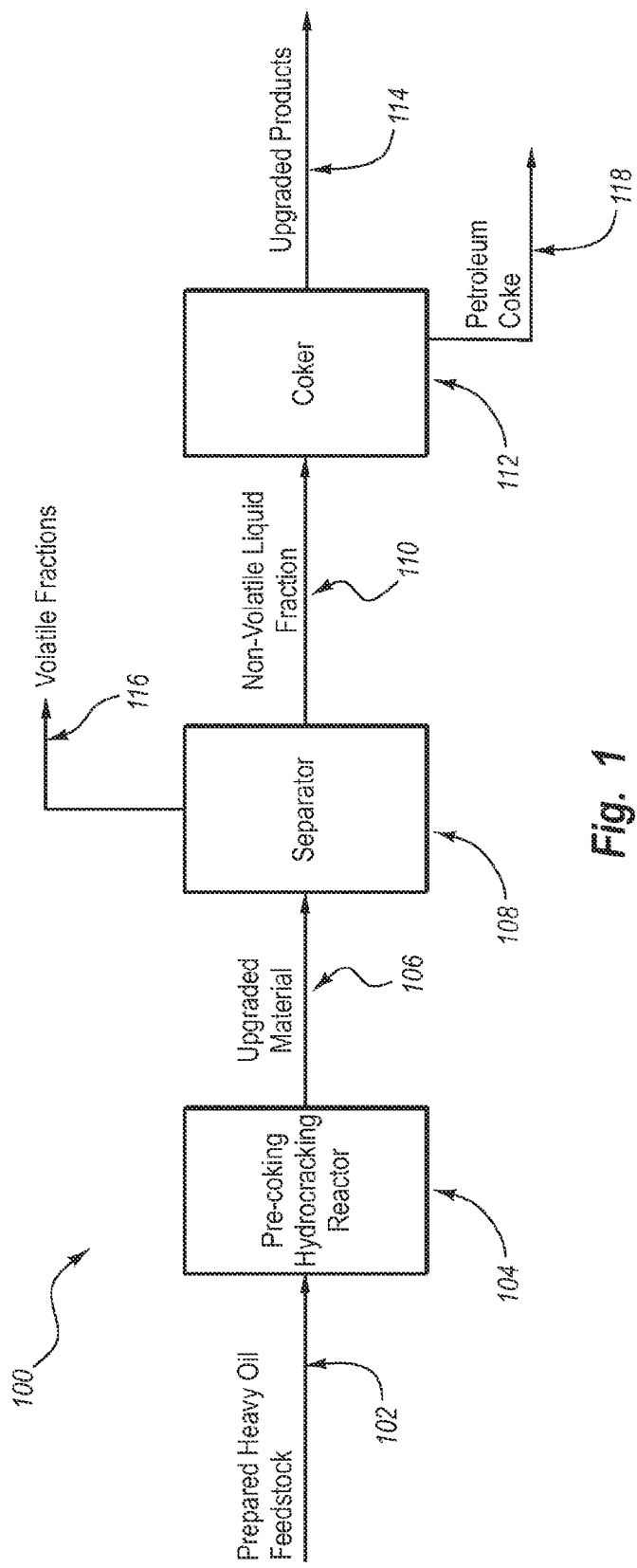
FIG. 1 is a block diagram that schematically illustrates a hydroprocessing system according to the invention for upgrading a heavy oil feedstock.

The present invention relates to methods and systems for upgrading heavy oil feedstock by using a hydrocracking reactor that employs a colloidal or molecular catalyst and a coking reactor downstream of the hydrocracking reactor, increasing yield and conversion rate, improving quality of upgraded liquid hydrocarbons, and reducing formation of coke compared to conventional hydrocracking or coking methods and systems. According to one embodiment, the methods and systems employ at least one pre-coking hydrocracking reactor, at least one separator, and at least one coking reactor. The inventive hydroprocessing methods and systems may utilize the colloidal or molecular catalyst alone or in combination with a solid supported catalyst. The coking process downstream of the hydrocracking reactor(s) may be any coking process, such as residual oil coking, including delayed coking, fluid coking, Flexicoking®, and combinations or variations thereof.

The term "coking" refers to a thermal cracking process that converts petroleum residuum, e.g., bottoms from atmospheric and vacuum distillation of crude oil, into upgraded liquid and gas products, leaving behind a solid concentrated carbon material, or "petroleum coke".

The terms "coker" and "coking system" are used interchangeably and refer to an apparatus system used in carrying out the coking process. The term "coking reactor" refers to an apparatus unit of a coking system in which a substantial level of thermal cracking occurs. For example, in a delayed coking process, a coke drum is an example of a coking reactor.

The terms "coking fractionators", "coker fractionators", "combination distillation tower", and "main fractionators" refer to the apparatus unit in a coking system that receives heavy oil feed (usually vacuum reduced crude) and coker overheads, and fractionates its contents into gases, gasoline, diesel, heavy coker gas oil, and a coke stream that is returned to the coking reactor.

The terms "colloidal catalyst" and "colloidally-dispersed catalyst" shall refer to catalyst particles having a particle size that is colloidal in size, e.g., less than about 500 nm in diameter, preferably less than about 100 nm in diameter, more preferably less than about 10 nm in diameter, even more preferably less than about 5 nm in diameter, and most preferably less than about 1 nm in diameter. The term "colloidal catalyst" includes, but is not limited to, molecular or molecularly-dispersed catalyst compounds.

The terms "molecular catalyst" and "molecularly-dispersed catalyst" shall refer to catalyst compounds that are essentially "dissolved" or completely dissociated from other catalyst compounds or molecules in a heavy oil hydrocarbon feedstock, non-volatile liquid hydrocarbon fraction, bottoms fraction, resid, or other feedstock or product in which the catalyst may be found. It shall also refer to very small catalyst particles that only contain a few catalyst molecules joined together (e.g., 15 molecules or less).

The terms "residual catalyst", "residual molecular catalyst" and "residual colloidal catalyst" shall refer to catalyst molecules or colloidal particles that remain with an upgraded feedstock or material when transferred from one vessel to another (e.g., from a hydrocracking reactor to a hot separator, another hydroprocessing reactor, or distillation tower).

The term "conditioned feedstock" shall refer to a heavy oil feedstock into which an oil soluble catalyst precursor composition has been combined and mixed sufficiently so that, upon decomposition of the catalyst precursor and formation of the colloidal or molecular catalyst in situ, the catalyst will comprise a colloidal or molecular catalyst dispersed within the feedstock.

The term "hydrocracking" shall refer to a process whose primary purpose is to reduce the boiling range of a heavy oil feedstock and in which a substantial portion of the feedstock is converted into products with boiling ranges lower than that of the original feedstock. Hydrocracking generally involves fragmentation of larger hydrocarbon molecules into smaller molecular fragments having a fewer number of carbon atoms and a higher hydrogen-to-carbon ratio. The mechanism by which hydrocracking occurs typically involves the formation of hydrocarbon free radicals during fragmentation followed by capping of the free radical ends or moieties with hydrogen. The hydrogen atoms or radicals that react with hydrocarbon free radicals during hydrocracking are generated at or by active catalyst sites.

The term "hydrotreating" shall refer to a more mild operation whose primary purpose is to remove impurities such as sulfur, nitrogen, oxygen, halides, and trace metals from the feedstock and saturate olefins and/or stabilize hydrocarbon free radicals by reacting them with hydrogen rather than allowing them to react with themselves. The primary purpose is not to change the boiling range of the feedstock. Hydrotreating is most often carried out using a fixed bed reactor, although other hydroprocessing reactors can also be used for hydrotreating, an example of which is an ebullated bed hydrotreater.

Of course, "hydrocracking" may also involve the removal of sulfur and nitrogen from a feedstock as well as olefin saturation and other reactions typically associated with "hydrotreating". The terms "hydroprocessing" and "hydroconversion" shall broadly refer to both "hydrocracking" and "hydrotreating" processes, which define opposite ends of a spectrum, and everything in between along the spectrum.

The terms "solid supported catalyst", "porous supported catalyst" and "supported catalyst" shall refer to catalysts that are typically used in conventional ebullated bed and fixed bed hydroprocessing systems, including catalysts designed primarily for hydrocracking or hydrodemetallization and catalysts designed primarily for hydrotreating. Such catalysts typically comprise (i) a catalyst support having a large surface area and numerous interconnected channels or pores of uneven diameter and (ii) fine particles of an active catalyst such as sulfides of cobalt, nickel, tungsten, and molybdenum dispersed within the pores. For example a heavy oil hydrocracking catalyst manufactured by Criterion Catalyst, Criterion 317 trilobe catalyst, has a bi-modal pore size distribution, with 80% of the pores ranging between 30 to 300 Angstroms with a peak at 100 Angstroms and 20% of the pores ranging between 1000 to 7000 Angstroms with a peak at 4000 Angstroms. The pores for the solid catalyst support are of limited size due to the need for the supported catalyst to maintain mechanical integrity to prevent excessive breakdown and formation of excessive fines in the reactor and also maintain sufficiently high surface area. Supported catalysts are commonly produced as cylindrical pellets, spherical solids, or extrudates.

The term "heavy oil feedstock" shall refer to heavy crude, oils sands bitumen, bottom of the barrel and resid left over from refinery processes (e.g., visbreaker bottoms), and any other lower quality material that contains a substantial quantity of high boiling hydrocarbon fractions (e.g., that boil at or above 343° C. (650° F.), more particularly at or above about 524° C. (975° F.)), and/or that include a significant quantity of asphaltenes that can deactivate a solid supported catalyst and/or cause or result in the formation of coke precursors and sediment. Examples of heavy oil feedstocks include, but are not limited to, Lloydminster heavy oil, Cold Lake bitumen, Athabasca bitumen, Maya, Isthmus, Ku-Maloob-Zaap ("Ku"), Boscan, Ural, Siberian, atmospheric tower bottoms, vacuum tower bottoms, residuum (or "resid"), resid pitch, vacuum residue, and nonvolatile liquid hydrocarbon fractions that remain after subjecting crude oil, bitumen from tar sands, liquefied coal, oil shale, or coal tar feedstocks to distillation, hot separation, and the like and that contain higher boiling fractions and/or asphaltenes.

The term "hydrocracking reactor" shall refer to any vessel in which hydrocracking (i.e., reducing the boiling range) of a feedstock in the presence of hydrogen and a hydrocracking catalyst is the primary purpose. Hydrocracking reactors are characterized as having an input port into which a heavy oil feedstock and hydrogen can be introduced, an output port from which an upgraded feedstock or material can be withdrawn, and sufficient thermal energy so as to form hydrocarbon free radicals in order to cause fragmentation of larger hydrocarbon molecules into smaller molecules. Examples of hydrocracking reactors include, but are not limited to, two-phase hydrocracking reactors (i.e., a two phase, gas-liquid system), ebullated bed reactors (i.e., a three phase, gas-liquid-solid system), fixed bed reactors (i.e., a three-phase system that includes a liquid feed trickling downward over a fixed bed of solid supported catalyst with hydrogen typically flowing cocurrently, but possibly countercurrently in some cases).

The term "hydrocracking temperature" shall refer to a minimum temperature required to effect significant hydrocracking of a heavy oil feedstock. In general, hydrocracking temperatures will preferably fall within a range of about 395° C. (743° F.) to about 460° C. (860° F.), more preferably in a range of about 410° C. (770° F.) to about 450° C. (842° F.), and most preferably in a range of about 420° C. (788° F.) to about 445° C. (833° F.). It will be appreciated that the temperature required to effect hydrocracking may vary depending on the properties and chemical make-up of the heavy oil feedstock. Severity of hydrocracking may also be imparted by varying the space velocity of the feedstock, i.e., the residence time of feedstock in the reactor, while maintaining the reactor at a fixed temperature. Milder reactor temperature and longer feedstock space velocity are typically required for heavy oil feedstock with high reactivity and/or high concentration of asphaltenes.

The term "gas-liquid slurry phase hydrocracking reactor" shall refer to a hydroprocessing reactor that includes a continuous liquid phase and a gaseous disperse phase which forms a "slurry" of gaseous bubbles within the liquid phase. The liquid phase typically comprises a hydrocarbon feedstock that may contain a low concentration of a colloidal catalyst or molecular-sized catalyst, and the gaseous phase typically comprises hydrogen gas, hydrogen sulfide, and vaporized low boiling point hydrocarbon products. A "gas-liquid slurry phase hydrocracking reactor" should not be confused with a conventional slurry phase reactor, which includes three phases: a solid particulate slurry catalyst phase that is typically micron-sized or larger, a gaseous phase, and a liquid phase.

The term "gas-liquid-solid, 3-phase slurry hydrocracking reactor" is used when a solid catalyst is employed along with liquid and gas. The gas may contain hydrogen, hydrogen sulfide and vaporized low boiling hydrocarbon products. The term "slurry phase reactor" shall broadly refer to both type of reactors (e.g., those with a colloidal or molecular catalyst, those with a micron-sized or larger particulate catalyst, and those that include both). In most cases, it shall refer to a reactor that at least includes a colloidal or molecular catalyst.

The term "asphaltene" shall refer to the fraction of a heavy oil feedstock that is typically insoluble in paraffinic solvents such as propane, butane, pentane, hexane, and heptane and that includes sheets of condensed ring compounds held together by hetero atoms such as sulfur, nitrogen, oxygen and metals. Asphaltenes broadly include a wide range of complex compounds having anywhere from 80 to 160,000 carbon atoms, with predominating molecular weights, as determined by solution techniques, in the 5000 to 10,000 range. About 80-90% of the metals in the crude oil are contained in the asphaltene fraction which, together with a higher concentration of non-metallic hetero atoms, renders the asphaltene molecules more hydrophilic and less hydrophobic than other hydrocarbons in crude.

The terms "upgrade", "upgrading" and "upgraded", when used to describe a feedstock that is being or has been subjected to hydroprocessing, or a resulting material or product, shall refer to one or more of a reduction in the molecular weight of the feedstock, a reduction in the boiling point range of the feedstock, a reduction in the concentration of asphaltenes, a reduction in the concentration of hydrocarbon free radicals, and/or a reduction in the quantity of impurities, such as sulfur, nitrogen, oxygen, halides, and metals.

II. Exemplary Hydroprocessing Methods and Systems

FIG. 1 schematically illustrates a hydroprocessing system 100 according to the invention comprising (a) a pre-coking hydrocracking reactor 104 configured to receive a prepared heavy oil feedstock 102 having a colloidal or molecular catalyst dispersed therein and producing an upgraded material 106; (b) a separator 108 into which the upgraded material 106 withdrawn from the pre-coking hydrocracking reactor 104 is transferred to separate gaseous and volatile fractions 116 from a non-volatile liquid hydrocarbon fraction 110; and (c) a coker 112 that upgrades the non-volatile liquid hydrocarbon fraction 110 through thermal cracking to form upgraded liquid hydrocarbon products 114 and petroleum coke 118.

The prepared heavy oil feedstock 102 may comprise any desired fossil fuel feedstock and/or fraction thereof including, but not limited to, one or more of heavy crude, oil sands bitumen, bottom of the barrel fractions from crude oil, atmospheric tower bottoms, vacuum tower bottoms, coal tar, liquefied coal, and other resid fractions.

A common characteristic of heavy oil feedstocks 102 that may advantageously be upgraded using the hydroprocessing methods and systems according to the invention is that they include a significant fraction of high boiling point hydrocarbons (i.e., at or above 343° C. (650° F.), more particularly at or above about 524° C. (975° F.)) and/or asphaltenes. The pre-coking hydrocracking reactor 104 may comprise any hydrocracking reactor or system of reactors known in the art, including but not limited to, one or more gas-liquid slurry-phase reactors, gas-liquid-solid slurry-phase reactors, ebullated bed reactors, fixed bed reactors, or moving bed reactors. Ebullated bed, fixed bed, moving bed, and gas-liquid-solid slurry-phase reactors are three phase slurry systems consisting of a solid catalyst, a liquid feedstock, and a gas containing hydrogen, hydrogen sulfide, and vaporized low boiling hydrocarbons. A significant difference between the pre-coking hydrocracking reactor 104 within hydroprocessing system 100 according to the invention and conventional hydrocracking reactors is that the heavy oil feedstock 102 introduced into the pre-coking hydrocracking reactor 104 includes a colloidal or molecular catalyst and/or a well-dispersed catalyst precursor capable of forming the colloidal or molecular catalyst in situ within feed heaters (not shown) and/or the pre-coking hydrocracking reactor 104 itself. The colloidal or molecular catalyst, the formation of which is discussed in more detail below, may be used alone or in combination with other catalysts, such as conventional solid supported catalysts (e.g., porous catalysts with active catalytic sites located within the pores).

The separator 108 may comprise one or more hot separators, distillation towers, fractionators, or other separators known in the art. When the separator 108 is a hot separator, a difference between the hot separator within hydroprocessing system 100 and hot separators used in conventional systems is that the upgraded feedstock or material introduced into the hot separator includes residual colloidal or molecular catalyst dispersed therein as well as dissolved hydrogen. As a result, any hydrocarbon free radicals, including asphaltene free radicals, that are generated within the hot separator and/or which persist within the upgraded feedstock as withdrawn from the pre-coking hydrocracking reactor 104 can be further hydroprocessed in the hot separator 108.

More particularly, the colloidal or molecular catalyst within the upgraded material transferred from the pre-coking hydrocracking reactor 104 to the hot separator 108 is able to catalyze beneficial upgrading or hydrotreating reactions between the hydrocarbon free radicals and hydrogen within the hot separator 108. The result is a more stable upgraded feedstock, decreased sediment and coke precursor formation, and decreased fouling of the hot separator 108 compared to hydroprocessing systems that do not utilize a colloidal or molecular catalyst.

The coker 112 of the hydroproces sing system 100 may be a delayed coker, fluid coker, flexicoker, or variations thereof, so long as the coking system is set up to receive and process the non-volatile liquid fraction 110, such as vacuum reduced crude (VRC), by thermal cracking to form upgraded liquid hydrocarbon products as the main product and petroleum coke as byproduct. Metals contained with the liquid fraction 110, including the colloidal or molecular catalyst metal, may precipitate out with the petroleum coke product.

The molecular or colloidal catalysts used in the system may optionally be removed from the liquid fraction 110 before entering the one or more coking reactors using a guard bed containing a solid supported catalyst. Thus, the hydroprocessing system in the scheme of FIG. 1 may be implemented as comprising: (1) a heavy oil feedstock comprised of a substantial quantity of hydrocarbons having a boiling point greater than about 650° F. and a colloidal or molecular catalyst dispersed throughout the feedstock; (2) a pre-coking hydrocracking reactor that heats or maintains the heavy oil feedstock at a hydrocracking temperature together with hydrogen during use in order to convert at least a portion of higher boiling hydrocarbons in the heavy oil feedstock to lower boiling hydrocarbons and thereby form an upgraded material, the pre-coking hydrocracking reactor comprised of (i) an inlet port at a bottom of the reactor into which the heavy oil feedstock and hydrogen are introduced and (ii) an outlet port at a top of the reactor from which the upgraded material, colloidal or molecular catalyst, and hydrogen are withdrawn; (3) a separator that separates gaseous and volatile fractions from a liquid hydrocarbon fraction in the upgraded material, the separator comprised of (i) an inlet through which the upgraded material is introduced into the separator, (ii) a first outlet through which the gaseous and volatile fractions are withdrawn, and (iii) a second outlet through which the liquid hydrocarbon fraction is withdrawn; and (4) one or more coking reactors configured to receive and process the cleaned liquid hydrocarbon fraction in order to yield upgraded hydrocarbon products and coke. An optional guard bed containing a solid supported catalyst for hydrotreating the liquid hydrocarbon fraction can be included in order for the solid supported catalyst to remove at least a portion of the residual colloidal or molecular catalyst, metal contaminants, sulfur and other impurities from the liquid hydrocarbon fraction at some point in the process.

Figure 2:
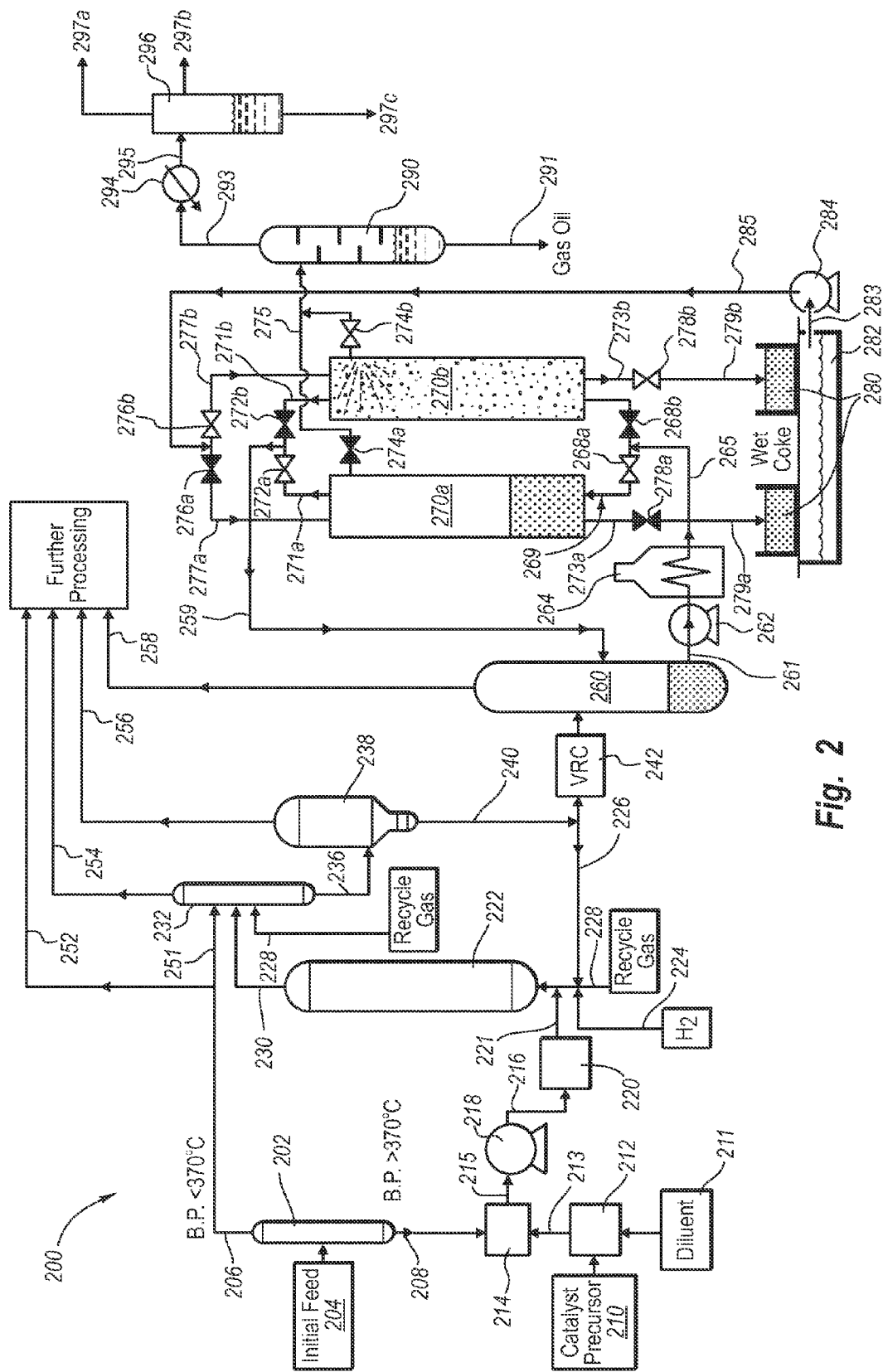
FIG. 2 schematically illustrates an exemplary hydroprocessing system that includes a delayed coker according to the invention.

FIG. 2 depicts an exemplary refining system 200 that integrates hydrocracking and delayed coking according to the invention. The refining system 200 may itself comprise a module within an even more detailed and complex oil refinery system, including a module that is added to a pre-existing refinery system as part of an upgrade. The refining system 200 more particularly includes a distillation tower 202 into which an initial feed 204 comprising a significant fraction of higher boiling hydrocarbons is introduced. By way of example and not limitation, gases and/or lower boiling hydrocarbons 206 having a boiling point less than 370° C. (698° F.) are separated from a higher boiling liquid hydrocarbon fraction 208 comprising materials having a boiling point greater than 370° C. (698° F.). The lower boiling hydrocarbons 206 can be further processed downstream either as a feed 251 to a separator 232 or a stream of straight-run upgraded products 252 including gasoline, diesel, jet fuel, kerosene, etc. In this embodiment, the higher boiling liquid hydrocarbon fraction 208 advantageously comprises a "heavy oil feedstock" within the meaning of this term.

An oil soluble catalyst precursor 210 is pre-blended with a hydrocarbon oil fraction or diluent 211 having a boiling range between 250-524° C. (482-975° F.), preferably having boiling point between 360-500° C. (680-932° F.), and mixed for a period of time in a pre-mixer 212 to form a diluted precursor mixture 213 in which the catalyst precursor 210 is well-mixed with the diluent 211. By way of example, the pre-mixer 212 may be an in-line static mixer. The diluted precursor mixture 213 and heavy oil feedstock 208 are combined within a conditioning chamber 214 in order to thoroughly disperse the catalyst precursor 210 within the heavy oil feedstock 208 and form a conditioned feedstock 215. The conditioning chamber 214 can be a high shear mixing apparatus and/or may include a surge vessel for the feedstock 208. A surge vessel is commonly used to dampen flow fluctuation ahead of downstream processing units and can be used for mixing. By way of example, the mixing in chamber 214 may consist of a pump-around loop system.

The conditioned feedstock 215 is pressurized using a multi-stage pump 218. The pump 218 may consist of many compression stages, with each stage providing additional mixing and blending of the catalyst precursor 210 within the conditioned feedstock 215 to form a finally conditioned feedstock 216 in which the catalyst precursor 210 is more thoroughly mixed throughout the feedstock 208.

The finally conditioned feedstock 216 is introduced into a pre-heater or furnace 220 so as to heat the finally conditioned feedstock 216 to a temperature that is about 150° C. (270° F.), preferably about 100° C. (180° F.) below the temperature in the slurry phase reactor 222. The oil soluble catalyst precursor 210 dispersed throughout the feedstock 208 decomposes and combines with sulfur released from the heavy oil feedstock 208 to yield a colloidal or molecular catalyst as the finally conditioned feedstock 216 travels through the pre-heater or furnace 220 and is heated to a temperature higher than the decomposition temperature of the catalyst precursor. This yields a prepared feedstock 221, which is introduced under pressure into a slurry phase reactor 222. Hydrogen gas 224, preferably preheated, is also introduced into the reactor 222 under pressure to effect hydrocracking of the prepared feedstock 221 within the reactor 222. Heavy oil resid bottoms 226 produced downstream from the slurry phase reactor 222 may optionally be recycled back into the reactor 222. The resid bottoms 226 may advantageously include residual colloidal or molecular catalyst dispersed therein. The recycle gas 228 advantageously includes hydrogen. The slurry phase reactor 222 may contain a recycle channel, recycling pump, and distributor grid plate as in a conventional ebullated bed reactor to promote more even dispersion of reactants, catalyst, and heat (e.g., in a manner similar to conventional ebullated bed reactors).

The prepared feedstock 221 within the slurry phase reactor 222 is heated or maintained at a hydrocracking temperature, which causes or allows the prepared feedstock 221, in combination with catalyst and hydrogen in the reactor 222, to be upgraded so as to form an upgraded material 230 that is withdrawn at the top of the reactor 222. According to one embodiment, the upgraded material 230 is transferred directly to a separator 232 (e.g., hot separator or distillation tower), optionally together with at least a portion 251 of the lower boiling point fraction 206 from first distillation tower 202 and/or recycle gas 228 produced downstream. Alternatively, the upgraded material 230 may be introduced into one or more hydroprocessing reactors (not shown) upstream or downstream from the separator 232.

Gases and volatile liquids 254 are removed from the top of 232 and sent downstream for further processing. A higher boiling liquid hydrocarbon fraction 236 is withdrawn from the bottom of the separator 232 and further processed. According to one embodiment, liquid hydrocarbon fraction 236 is introduced into a vacuum distillation tower 238 in order to separate lower boiling fractions 256 that can be volatilized through vacuum distillation and a high boiling resid fraction 240 of lower quality that is withdrawn from the bottom of vacuum tower 238 and either used as a vacuum reduced crude (VRC) 242 as a coker feed to a coking fractionator 260 of a delayed coking system and/or as a residue 226 that is recycled back into the slurry phase reactor 222, as discussed above.

The lower boiling fractions 256 typically include light vacuum gas oil and heavy vacuum gas oil. The lower boiling fraction 256 may be combined with at least a portion of the lower boiling point fraction 252 withdrawn from the first distillation tower 202 and the gases and volatile liquids 254 removed from the separator 232 and introduced into a mixed feed hydrotreater or hydrocracking reactor (not shown) for downstream processing to yield gasoline and other petroleum products.

The vacuum reduced crude (VRC) 242 is introduced into a coking fractionator 260, which combines the VRC feed 242 and coker overhead from overhead return line 259 (hence a coking fractionator is also known as a combination distillation tower). The coking fractionator fractionates its contents into a lighter upgraded product stream 258 and a coking stream 261. The lighter upgraded product stream 258 comprises gases, coker naphtha and coker gas oil.

The coking stream 261 is introduced through a coker charge pump 262 to a furnace 264. The coker charge pump 262 is normally driven by an electric motor with a steam-driven turbine pump as a backup. The pressure may be in excess of 35 bars (500 psig) with a mechanical seal operating up to 382° C. (720° F.). The coker furnace 264 heats the coking stream 261 to a coking temperature, about 500° C. (930° F.), with a pressure of about 4 bars (60 psig). In an alternative embodiment, that other streams can be added to the coker feed stream 261, such as conventional straight-run vacuum resid. For example, in some embodiments less than 100% of the coker feed is initially processed through the slurry hydrocracking process, with that balance being fed into the coker without first being hydroprocessed by the slurry phase reactor.

Then the coking stream is introduced through a transfer line 265 and an open feed valve 268a to an online coke drum 270a, wherein thermal cracking reactions occur, yielding coke and coker vapor overheads. The transfer line 265 can be well insulated to prevent coking and plugging. The shorter the transfer line is, the shorter the delay is between heating and thermal cracking reactions. This delay gives the process its name of "delayed coking".

Thermal cracking reactions in the coke drum 270a cause the formation of solid coke and coker vapor overheads. The coker vapor overheads exit through coker overhead exit line 271a and an opened coker overhead exit valve 272a, returning to the coking fractionator 260 through the coker overhead return line 259. The temperature in the exit line 271a and return line 259 can be around 443° C. (830° F.). The temperature can be decreased by about 28° C. (50° F.) by injecting hot heavy coker gas oil (not shown) into the line 271a as quench oil to prevent coking in the line.

The delayed coking system implemented here has two alternating coke drums to allow continuous operation, wherein the online coke drum 270a undergoes coking reactions and the offline coke drum 270b is undergoing decoking. The two drums alternate between coking and decoking, allowing continuous operation. As illustrated here, the coke formed in the offline coke drum 270b is being removed by hydraulic coke cutting, wherein high pressure water is used to cut the coke out of the offline coke drum 270b. Water pressures can range from 86 bars (1250 psig) to 275 bars (4000 psig) and flow rates range from 2.8 cubic meters per minute (750 GPM) to 4.7 cubic meters per minute (1250 GPM). A cut water pump 284 is a multistage barrel type or a split case multistage pump. The pump 284 can be powered with an electric motor or steam-driven turbines.

Wet coke cut off from the coke drum 270b exits through a coke exit line 273b and an opened coke exit valve 278b, passing through coke transfer line 279b to a wet coke receptor 280, where water is separated from coke and recycled through a cut water pump 284 and a water recycle line 285, an open water inlet valve 276b and water inlet line 277b, and used for decoking again.

Decoking also involves steaming out and quenching with water. When a coke drum is undergoing decoking, the steam and hydrocarbon vapor are directed through an opened blow-down valve 274b and a blow-down exit line 275 to a blow-down system comprising a quench tower 290, a blow-down condenser 294 and an settling drum 296. This blow-down system is utilized for both pollution control and for increased recovery of hydrocarbons. During the time that a drum, such as drum 270b is steamed out and cooled by water injection, wherein steam and hydrocarbons stripped from the coke are directed to the quench tower 290. In quench tower 290, hydrocarbons are condensed and returned as gas oil in a gas oil return line 291 to the coking fractionator 260. Steam mixed with hydrocarbons removed from the quench tower 290 is condensed in a blow-down condenser 294 along with an amount of oil. The oil and condensed water are separated in the settling drum 296 and exit as gas 297a, light coker gas oil 297b, and sour water 297c.

The on-line off-line alteration between the two coke drums are controlled by a series of process stream and water valves of corresponding pairs, e.g., the feed valves 268a-b, and the water inlet valves 276a-b.

The upgraded liquid hydrocarbon products from coking 259 can be separately or in combination with other upgraded streams 252, 254, 256 further processed to produce gasoline and other upgraded hydrocarbon products.

A. Preparation and Characteristics of Colloidal or Molecular Catalyst

Figure 3:
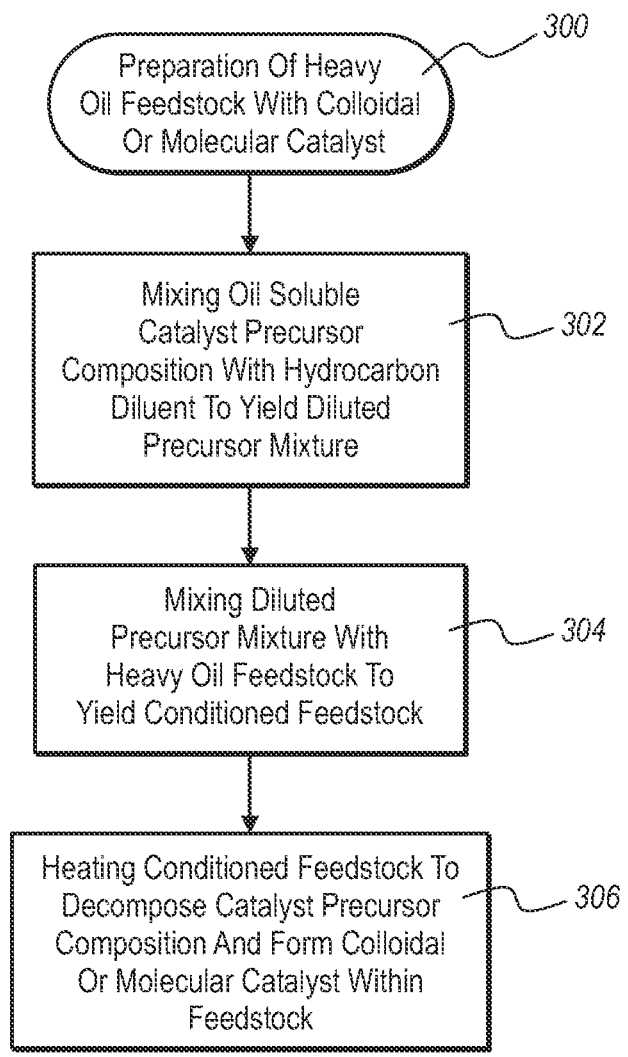
FIG. 3 is a flow diagram that schematically illustrates an exemplary process for preparing a heavy oil feedstock to include a colloidal or molecular catalyst dispersed therein.

The methods according to the invention include the preliminary step of preparing a heavy oil feedstock so as to have a colloidal or molecular catalyst dispersed therein, an example of which is schematically illustrated in the flow diagram depicted in FIG. 3 as method 300. According to one embodiment, an oil soluble catalyst precursor composition is pre-mixed with a diluent hydrocarbon stream to form a diluted precursor mixture, as in step 302.

The oil soluble catalyst precursor preferably has a decomposition temperature in a range from about 100° C. (212° F.) to about 350° C. (662° F.), more preferably in a range of about 150° C. (302° F.) to about 300° C. (572° F.), and most preferably in a range of about 175° C. (347° F.) to about 250° C. (482° F.). Examples of catalyst precursors include organometallic complexes or compounds, more specifically, oil-soluble compounds or complexes of transition metals and organic acids. The catalyst precursor composition comprises at least one transition metal and at least one organic moiety. Examples of useful transition catalyst metals include Mo, Ni, Co, W, Fe, V and combinations thereof. Examples of organic moieties include, but are not limited to, ligands comprising or derived from 3-cyclopentylpropionic acid, cyclohexanebutyric acid, biphenyl-2-carboxylic acid, 4-heptylbenzoic acid, 5-phenylvaleric acid, geranic acid, 10-undecenoic acid, dodecanoic acid, octanoic acid, 2-ethylhexanoic acid, naphthanic acid, pentacarbonyl, or hexacarbonyl. Exemplary precursor compositions include, but are not limited to, molybdenum 2-ethylhexanoate, molybdenum naphthanate, vanadium naphthanate, vanadium octoate, molybdenum hexacarbonyl, vanadium hexacarbonyl, iron pentacarbonyl, molybdenum 3-cyclopentylpropionate, molybdenum cyclohexanebutanoate, molybdenum biphenyl-2-carboxylate, molybdenum 4-heptylbenzoate, molybdenum 5-phenylpentanoate, molybdenum geranate, molybdenum 10-undecenoate, molybdenum dodecanoate.

One of skill in the art can, following the present disclosure, select a mixing temperature profile that results in intimate mixing of a selected precursor composition without substantial decomposition prior to formation of the colloidal or molecular catalyst.

Examples of suitable hydrocarbon diluents include, but are not limited to, vacuum gas oil (which typically has a boiling range of 360-524° C.) (680-975° F.), decant oil or cycle oil (which typically has a boiling range of 360°-550° C.) (680-1022° F.), and light gas oil (which typically has a boiling range of 200°-360° C.) (392-680° F.).

The ratio of catalyst precursor to hydrocarbon oil diluent is preferably in a range of about 1:500 to about 1:1, more preferably in a range of about 1:150 to about 1:2, and most preferably in a range of about 1:100 to about 1:5 (e.g., 1:100, 1:50, 1:30, or 1:10).

The catalyst precursor is advantageously mixed with the hydrocarbon diluent at a temperature below which a significant portion of the catalyst precursor starts to decompose, preferably, at temperature in a range of about 25° C. (77° F.) to about 250° C. (482° F.), more preferably in a range of about 50° C. (122° F.) to about 200° C. (392° F.), and most preferably in a range of about 75° C. (167° F.) to about 150° C. (302° F.), to form the diluted precursor mixture. It will be appreciated that the actual temperature at which the diluted precursor mixture is formed typically depends largely on the decomposition temperature of the particular precursor that is utilized. The catalyst precursor is preferably mixed with the hydrocarbon oil diluent for a time period in a range of about 1 second to about 20 minutes, more preferably in a range of about 5 seconds to about 10 minutes, and most preferably in a range of about 20 seconds to about 5 minutes. The actual mixing time is dependent, at least in part, on the temperature (i.e., which affects the viscosity of the fluids) and mixing intensity. Mixing intensity is dependent, at least in part, on the number of stages e.g., for in-line static mixers.

Whereas it is within the scope of the invention to directly blend the catalyst precursor with heavy oil feedstocks, care must be taken in such cases to mix the components for a time sufficient to thoroughly blend the precursor within the feedstock before substantial decomposition of the precursor has occurred. For example, U.S. Pat. No. 5,578,197 to Cyr et al., the disclosure of which is incorporated by reference, describes a method whereby molybdenum 2-ethylhexanoate is mixed with bitumen vacuum tower residuum for 24 hours before the resulting mixture was heated in a reaction vessel to form the catalyst compound and to effect hydrocracking (see col. 10, lines 4-43). Whereas 24-hour mixing in a testing environment may be acceptable, such long mixing times may make certain industrial operations prohibitively expensive.

Pre-blending the catalyst precursor with a hydrocarbon diluent prior to blending the diluted precursor mixture with the heavy oil feedstock greatly aids in thoroughly and intimately blending the precursor within the feedstock, particularly in the relatively short period of time required for large-scale industrial operations to be economically viable. Forming a diluted precursor mixture shortens the overall mixing time by (1) reducing or eliminating differences in solubility between the more polar catalyst precursor and the heavy oil feedstock, (2) reducing or eliminating differences in rheology between the catalyst precursor and the heavy oil feedstock, and/or (3) breaking up the catalyst precursor molecules to form a solute within a hydrocarbon oil diluent that is much more easily dispersed within the heavy oil feedstock. It is particularly advantageous to first form a diluted precursor mixture in the case where the heavy oil feedstock contains water (e.g., condensed water). Otherwise, the greater affinity of the water for the polar catalyst precursor can cause localized agglomeration of the precursor, resulting in poor dispersion and formation of micron-sized or larger catalyst particles. The hydrocarbon oil diluent is preferably substantially water free (i.e., contains less than about 0.5% water) to prevent the formation of substantial quantities of micron-sized or larger catalyst particles.

The diluted precursor mixture is combined with a heavy oil feedstock, as in step 304 of method 300 illustrated in FIG. 3, and mixed for a time sufficient and in a manner so as to disperse the catalyst precursor throughout the feedstock and yield a conditioned feedstock in which the catalyst precursor is thoroughly mixed within the heavy oil feedstock prior to precursor decomposition. In order to obtain sufficient mixing of the catalyst precursor within the heavy oil feedstock to thereafter yield a colloidal or molecular catalyst upon decomposition of the precursor, the diluted precursor mixture and heavy oil feedstock are preferably mixed for a time period in a range of about 1 second to about 20 minutes, more preferably in a range from about 5 second to about 10 minutes, and most preferably in a range of about 20 seconds to about 3 minutes. Increasing the vigorousness and/or shearing energy of the mixing process generally reduce the time required to effect thorough mixing.

Examples of mixing apparatus that can be used to effect thorough mixing of the catalyst precursor and heavy oil feedstock include, but are not limited to, high shear mixing such as mixing created in a vessel with a propeller or turbine impeller; multiple static in-line mixers; multiple static in-line mixers in combination with in-line high shear mixers; multiple static in-line mixers in combination with in-line high shear mixers; multiple static in-line mixers in combination with in-line high shear mixers followed by a pump around in the surge vessel; combinations of the above followed by one or more multi-stage centrifugal pumps; and one or more multi-stage centrifugal pumps. According to one embodiment, continuous rather than batch-wise mixing can be carried out using high energy pumps having multiple chambers within which the catalyst precursor composition and heavy oil feedstock are churned and mixed as part of the pumping process itself. The foregoing mixing apparatus may also be used for the pre-mixing process discussed above in which the catalyst precursor is mixed with the hydrocarbon oil diluent to form the catalyst precursor mixture.

According to one embodiment, the diluted precursor mixture can be initially mixed with about 10-30% (e.g., 20%) of the heavy oil feedstock, the resulting mixed heavy oil feedstock can be mixed in with another 30-50% (e.g., 40%) of the heavy oil feedstock, and the resulting 50-70 (e.g., 60%) of the mixed heavy oil feedstock can be mixed in with the remainder 30-50% (e.g., 40%) of heavy oil in accordance with good engineering practice of progressive dilution to thoroughly disperse the catalyst precursor in the heavy oil feedstock. The foregoing percentages are merely illustrative and non-limiting. Vigorous adherence to the mixing time in the appropriate mixing devices or methods described herein should still be used in the progressive dilution approach.

In the case of heavy oil feedstocks that are solid or extremely viscous at room temperature, such feedstocks may advantageously be heated in order to soften them and create a feedstock having sufficiently low viscosity so as to allow good mixing of the catalyst precursor into the feedstock composition. These heavy oil feedstocks include, but are not limited to heavy crude oil, oil sand bitumen, atmospheric tower bottoms, vacuum tower bottoms, resid, visbreaker bottoms, coal tar, heavy oil from oil shale, and liquefied coal. In general, decreasing the viscosity of the heavy oil feedstock will reduce the time required to effect thorough and intimate mixing of the oil-soluble precursor composition within the feedstock. However, the feedstock should not be heated to a temperature above which significant decomposition of the catalyst precursor occurs until after thorough and complete mixing to form the conditioned feedstock. Premature decomposition of the catalyst precursor generally results in formation of micron-sized or larger catalyst particles rather than a colloidal or molecular catalyst. The heavy oil feedstock and diluted precursor mixture are preferably mixed and conditioned at a temperature in a range of about 25° C. (77° F.) to about 350° C. (662° F.), more preferably in a range of about 50° C. (122° F.) to about 300° C. (572° F.), and most preferably in a range of about 75° C. (167° F.) to about 250° C. (482° F.) to yield the conditioned feedstock.

After the catalyst precursor has been well-mixed throughout the heavy oil feedstock to yield a conditioned feedstock, this composition is heated to a temperature where significant decomposition of the catalyst precursor occurs in order to liberate the catalyst metal therefrom to form the final active catalyst. According to one embodiment, metal from the precursor reacts with sulfur liberated from the heavy oil feedstock to yield a metal sulfide compound that is the final active catalyst. Where the heavy oil feedstock includes sufficient or excess sulfur, the final activated catalyst may be formed in situ by heating to a temperature sufficient to liberate the sulfur therefrom. In some cases, sulfur may be liberated at the same temperature that the precursor decomposes. In other cases, further heating to a higher temperature may be required.

If the catalyst precursor is thoroughly mixed throughout the heavy oil feedstock, at least a substantial portion of the liberated metal ions will be sufficiently sheltered or shielded from other metal ions so that they can form a molecularly-dispersed catalyst upon reacting with sulfur to form the metal sulfide compound. Under some circumstances, minor agglomeration may occur, yielding colloidal-sized catalyst particles. However, it is believed that taking care to thoroughly mix the precursor throughout the feedstock will yield individual catalyst molecules rather than particles. Simply blending, while failing to sufficiently mix, the catalyst precursor with the feedstock typically causes formation of large agglomerated metal sulfide compounds that are micron-sized or larger.

In order to form the metal sulfide catalyst, the blended feedstock composition is preferably heated to a temperature in a range of about 225° C. (437° F.) to about 450° C. (842° F.), more preferably in a range of about 275° C. (527° F.) to about 440° C. (824° F.), and most preferably in a range of about 310° C. (590° F.) to about 420° C. (788° F.). According to one embodiment, the conditioned feedstock is heated to a temperature that is about 150° C. (270° F.) less than the hydrocracking temperature within the pre-coking hydrocracking reactor, preferably about 100° C. (180° F.) less than the hydrocracking temperature. According to one embodiment, the colloidal or molecular catalyst is formed during preheating before the heavy oil feedstock is introduced into the pre-coking hydrocracking reactor. According to another embodiment, at least a portion of the colloidal or molecular catalyst is formed in situ within the pre-coking hydrocracking reactor itself. In some cases, the colloidal or molecular catalyst can be formed as the heavy oil feedstock is heated to a hydrocracking temperature prior to or after being introduced into a hydrocracking reactor. The initial concentration of catalyst metal in the colloidal or molecular catalyst is preferably in a range of about 5 parts per million (ppm) to about 500 ppm by weight of the heavy oil feedstock, more preferably in a range of about 15 ppm to about 300 ppm, and most preferably in a range of about 25 ppm to about 175 ppm. The catalyst may become more concentrated (e.g., up to 5000 ppm) as volatile fractions are removed from a non-volatile resid fraction.

In the case where the heavy oil feedstock includes a significant quantity of asphaltene molecules, the catalyst molecules or colloidal particles will preferentially associate with, or remain in close proximity to, the asphaltene molecules. For one embodiment of the invention, the heavy oil feedstock comprises at least about 10 wt % asphaltenes or other coke forming precursors. The upgrading reactions in the process according to the invention reduce the quantity of asphaltenes or other coke forming precursors by at least 20 wt %, more preferably by at least 40 wt %, and even more preferably by at least 60 wt %.

Figure 4:
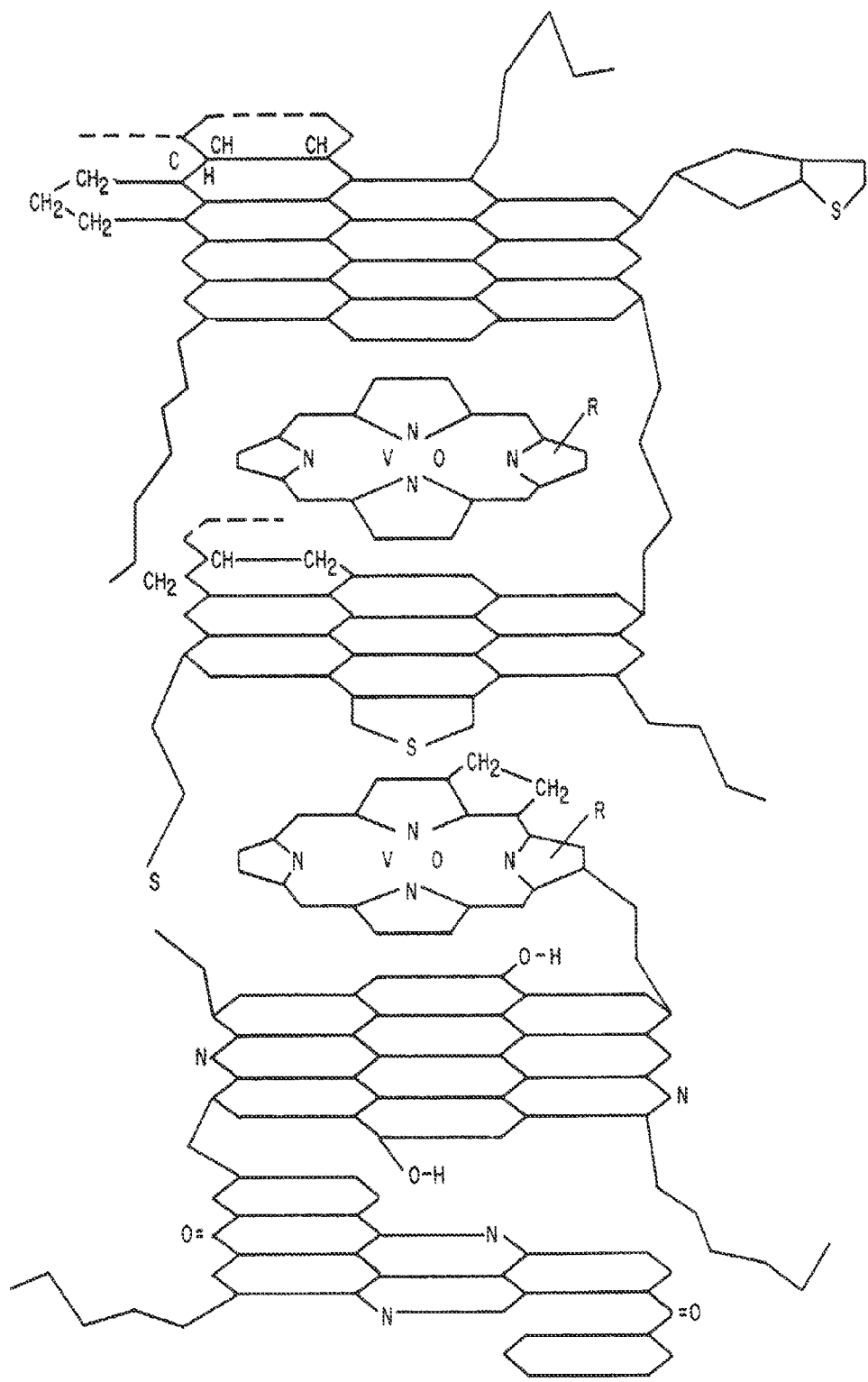
FIG. 4 depicts a hypothetical chemical structure for an asphaltene molecule.

Asphaltenes are complex hydrocarbon molecules that include a relatively low ratio of hydrogen to carbon that is the result of a substantial number of condensed aromatic and naphthenic rings with paraffinic side chains. A hypothetical asphaltene molecule structure developed by A.G. Bridge and co-workers at Chevron is depicted in FIG. 4. Sheets consisting of the condensed aromatic and naphthenic rings are held together by heteroatoms such as sulfur or nitrogen and/or polymethylene bridges, thio-ether bonds, and vanadium and nickel complexes. The asphaltene fraction also contains a higher content of sulfur and nitrogen than does crude oil or the rest of the vacuum resid, and it also contains higher concentrations of carbon-forming compounds (i.e., that form coke precursors and sediment).

Figure 5:
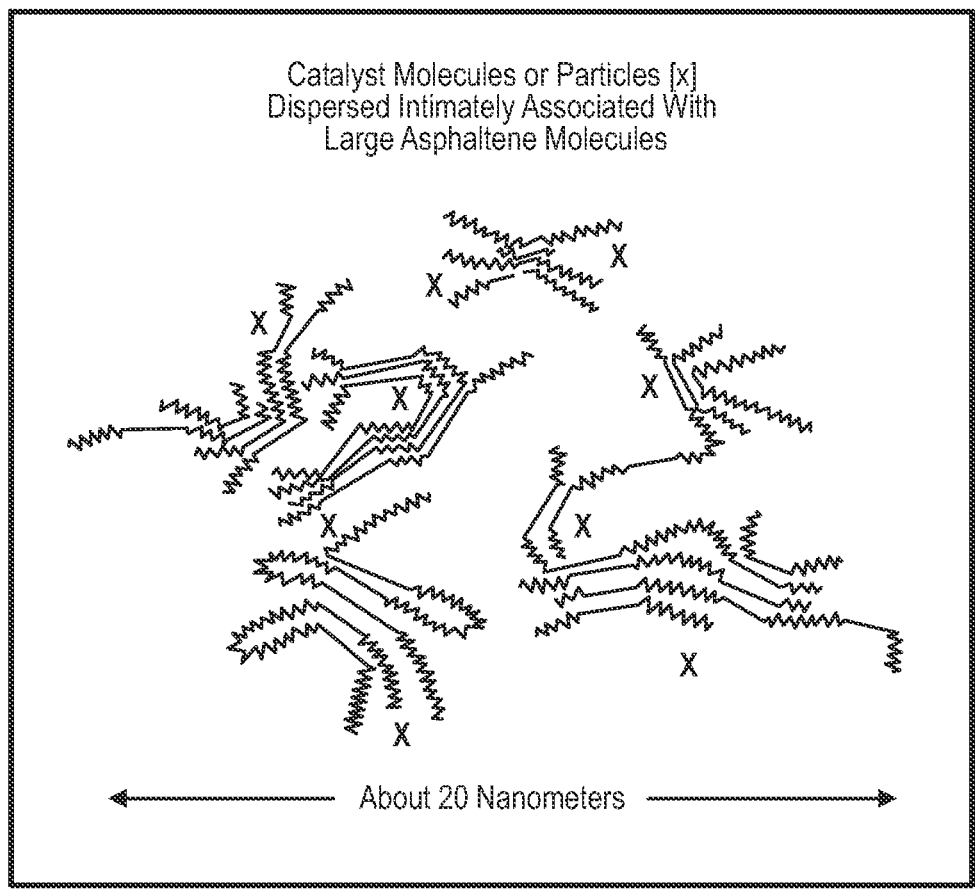
FIG. 5 schematically illustrates catalyst molecules or colloidal-sized catalyst particles associated with asphaltene molecules.

Asphaltene has a greater affinity for the colloidal or molecular catalyst since asphaltene molecules are generally more hydrophilic and less hydrophobic than other hydrocarbons contained within the heavy oil feedstock. Because the colloidal or molecular catalyst tends to be very hydrophilic, the individual particles or molecules will tend to migrate toward the more hydrophilic moieties or molecules within the heavy oil feedstock. FIG. 5 schematically depicts catalyst molecules, or colloidal particles "X" associated with, or in close proximity to, the asphaltene molecules.

While the highly polar nature of the catalyst compound causes or allows the colloidal or the molecular catalyst to associate with asphaltene molecules, it is the general incompatibility between the highly polar catalyst compound and the hydrophobic heavy oil feedstock that necessitates the aforementioned intimate or thorough mixing of the oil soluble catalyst precursor composition within the heavy oil feedstock prior to decomposition of the precursor and formation of the colloidal or molecular catalyst. Because metal catalyst compounds are highly polar, they cannot be effectively dispersed within a heavy oil feedstock in colloidal or molecular form if added directly thereto or as part of an aqueous solution or an oil and water emulsion. Such methods inevitably yield micron-sized or larger catalyst particles.

Figure 6A:
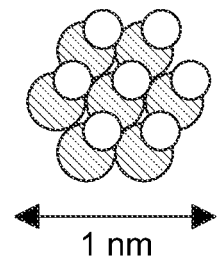
FIGS. 6A and 6B schematically depict top and side views of a molybdenum disulfide crystal approximately 1 nm in size.
Figure 6B:
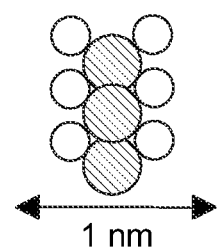

Reference is now made to FIGS. 6A and 6B, which schematically depict a nanometer-sized molybdenum disulfide crystal. FIG. 6A is a top view, and FIG. 6B is a side view of a molybdenum disulfide crystal. Molecules of molybdenum disulfide typically form flat, hexagonal crystals in which single layers of molybdenum (Mo) atoms are sandwiched between layers of sulfur (S) atoms. The only active sites for catalysis are on the crystal edges where the molybdenum atoms are exposed. Smaller crystals have a higher percentage of molybdenum atoms exposed at the edges.

The diameter of a molybdenum atom is approximately 0.3 nm, and the diameter of a sulfur atom is approximately 0.2 nm. A nanometer-sized crystal of molybdenum disulfide has 7 molybdenum atoms sandwiched in between 14 sulfur atoms. As seen in FIG. 6A, 6 out of 7 (85.7%) of the total molybdenum atoms will be exposed at the edge and available for catalytic activity. In contrast, a micron-sized crystal of molybdenum disulfide has several million atoms, with only about 0.2% of the total molybdenum atoms being exposed at the crystal edge and available for catalytic activity. The remaining 99.8% of the molybdenum atoms in the micron-sized crystal are embedded within the crystal interior and are therefore unavailable for catalysis. This means that nanometer-sized molybdenum disulfide particles are, at least in theory, orders of magnitude more efficient than micron-sized particles in providing active catalyst sites.

In practical terms, forming smaller catalyst particles results in more catalyst particles and more evenly distributed catalyst sites throughout the feedstock. Simple mathematics dictates that forming nanometer-sized particles instead of micron-sized particles will result in approximately $100^3$ (or 1 million) to $1000^3$ (or 1 billion) times more particles depending on the size and shape of the catalyst crystals. That means there are approximately 1 million to 1 billion times more points or locations within the feedstock where active catalyst sites reside. Moreover, nanometer-sized or smaller molybdenum disulfide particles are believed to become intimately associated with asphaltene molecules, as shown in FIG. 5. In contrast, micron-sized or larger catalyst particles are believed to be far too large to become intimately associated with or within asphaltene molecules.

B. Hydroprocessing Methods

Figure 7:
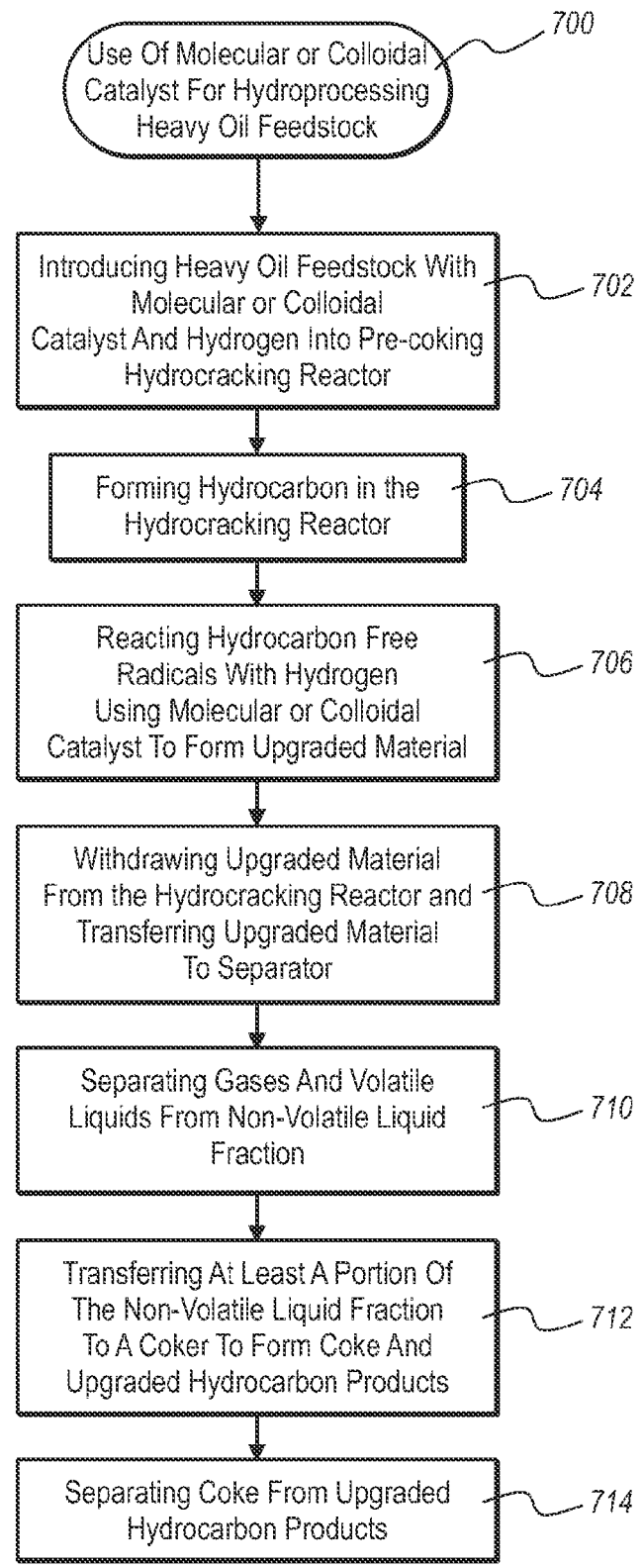
FIG. 7 is a flow diagram that schematically illustrates an exemplary hydroprocessing method according to the invention for upgrading a heavy oil feedstock.

FIG. 7 is a flow diagram that schematically illustrates an example method 700 for hydroprocessing a heavy oil feedstock according to the invention to form increased quantity and quality of upgraded liquid hydrocarbon products and reduced quantity of coke, as compared to conventional hydrocracking or thermal cracking upgrading methods.

First, a heavy oil feedstock is introduced together with hydrogen into a pre-coking hydrocracking reactor, as in step 702 of method 700. The heavy oil feedstock initially comprising at least about 30 wt %, or more preferably at least about 50 wt %, or even more preferably at least about 80 wt %, of hydrocarbons having a boiling point of at least about 524° C. (975° F.). The colloidal or molecular catalyst may be formed in situ within the heavy oil feedstock prior to introducing the feedstock in the pre-coking hydrocracking reactor, or at least a portion of the colloidal or molecular catalyst may be generated in situ within the pre-coking hydrocracking reactor itself. Examples of suitable hydrocracking reactors that may be used in this first step or subpart of the method include gas-liquid slurry phase reactors, gas-liquid-solid slurry phase reactors, ebullated bed reactors, fixed bed reactors and moving bed reactors.

Then, the heavy oil feedstock is heated to or maintained at a hydrocracking temperature so as to form hydrocarbon free radicals from hydrocarbon molecules in the heavy oil feedstock, as in step 704 of method 700. The feedstock may be introduced into the pre-coking hydrocracking reactor already heated to the hydrocracking temperature, or may be heated within the pre-coking hydrocracking reactor to the hydrocracking temperature in order to yield the hydrocarbon free radicals.

The colloidal or molecular catalyst within the feedstock catalyzes upgrading reactions between the hydrocarbon free radicals and the hydrogen within the pre-coking hydrocracking reactor to form an upgraded feedstock or material, as in step 706 of method 700. The upgrading reactions reduce the quantity of asphaltenes or other coke forming precursors, increase the hydrogen to carbon ratio in the upgraded material, and decrease the boiling points of hydrocarbons in the upgraded material compared to the heavy oil feedstock. According to one embodiment, excess hydrogen is introduced into the pre-coking hydrocracking reactor in order to ensure high conversion levels and throughput.

The upgraded material is withdrawn from the pre-coking hydrocracking reactor and transferred to a separator, as in step 708 of method 700. As discussed in more detail below, the upgraded material may alternatively be introduced into one or more additional pre-coking hydroprocessing reactors for further upgrading upstream or downstream from the separator. The separator allows or causes separation of gases and volatile liquids from a non-volatile liquid hydrocarbon fraction, as in step 710 of method 700. The gaseous and volatile liquid hydrocarbon fractions are advantageously withdrawn from the top of the separator and the non-volatile (or less volatile) liquid hydrocarbon fraction is withdrawn from the bottom of the separator.

In one embodiment, the separator comprises a hot separator. Because of the high temperature in the hot separator, residual colloidal or molecular catalyst within the liquid hydrocarbon fraction may continue to catalyze hydrogenation reactions between residual or newly added hydrogen and hydrocarbon free radicals that persist and/or that are newly generated within the hot separator. Because catalytic hydrogenation reactions continue, the temperature within the hot separator can be maintained at or near the hydrocracking temperature without fouling the equipment as a result of the formation of coke precursors and sediment, which could otherwise occur within the hot separator if the asphaltene radicals were allowed to react with each other and other hydrocarbon radicals instead of being capped with hydrogen.

At least a portion of the non-volatile (or less volatile) liquid hydrocarbon fraction withdrawn from the bottom of the separator is transferred to one or more coking reactors, as in step 712 of method 700, causing thermal cracking of the liquid hydrocarbon fraction to form upgraded hydrocarbon products and petroleum coke. In an implementation of the invention, at least a portion of the liquid hydrocarbon fraction introduced into the coking reactor comprises vacuum reduced crude (VRC). The coking reactors may be delayed coking reactors, fluid coking reactors, Flexicoking® reactors, or other coking reactors.

The molecular or colloidal catalysts used in the process may be recovered from the process stream as a recycle at the bottom of a separator or a distillation column. Optionally, the hydroprocessing method comprises introducing the liquid hydrocarbon fraction into a guard bed containing a solid supported catalyst before introducing it into the one or more coking reactors, the solid supported catalyst removing at least a portion of the residual colloidal or molecular catalyst and impurities in the liquid process stream.

Finally, the upgraded hydrocarbon products and coke are separated for further processing or storage, as in step 714 of method 700. The pre-coking hydrocracking reactions facilitated by the colloidal or molecular catalyst reduce coke-forming asphaltenes and other precursors, and increase hydrogen to carbon ratio of the processed stream. The process according to the invention leads to higher conversion level and yield and improved quality of upgraded hydrocarbons, as compared to conventional upgrading processes. It also reduces coke formation and equipment fouling, even in the coker, enabling processing of a wider range of lower quality feedstocks.

For the purpose of this invention, the term "conversion" is defined based on the amount of coke formed in the coker. In other words, % Conversion=100×(Resid Feedstock−Coke Formed)/(Resid Feedstock). The disclosed methods typically convert at least about 60 wt % of hydrocarbons from having a boiling point of at least 524° C. (975° F.) to having one below 524° C. (975° F.); preferably at least about 70 wt %, more preferably at least about 80 wt %, and most preferably at least about 85 wt %. An embodiment of the invention improves conversion rate by at least 4 wt %, or more preferably by at least 10 wt %, compared to an otherwise analogous coking method in the absence of pre-coking hydrocracking reactions catalyzed by the molecular or colloidal catalyst.

A method according to the invention yields at least 70 wt % of $C_4$+ hydrocarbons and a boiling point of less than 524° C. (975° F.). Preferably, the method improves yield of $C_4$+ hydrocarbons and a boiling point of less than 524° C. (975° F.) by at least 10% compared to an otherwise analogous coking method in the absence of pre-coking hydrocracking reactions catalyzed by the molecular or colloidal catalyst. A method implemented according to the invention reduces coke formation by at least 20 wt %, or more preferably by at least 50 wt %, compared to an otherwise analogous coking method without in the absence of pre-coking hydrocracking reactions catalyzed by the molecular or colloidal catalyst.

C. Hydroprocessing Systems

As mentioned above, the processing stream of hydrocarbons may undergo additional upgrading reactions before being processed by a coking reactor. FIGS. 8A-8B schematically illustrates exemplary system configurations in accordance with the invention that are variations of the configuration shown in FIG. 1. The system of FIG. 1 can be implemented to include a slurry phase pre-coking hydrocracking reactor 902 and a hot separator 904, the design and operation of which are shown and described more fully below with respect to FIG. 9. In an alternative embodiment, at least one pre-coking hydrocracking reactor may comprise an ebullated bed hydrocracking reactor 1030, the design and operation of which are shown and described more fully below with respect to FIG. 10. In another embodiment, at least one pre-coking hydrocracking reactor may comprise a fixed bed hydrocracking reactor 1160, the design and operation of which are shown and described more fully below with respect to FIG. 11.

Variations from the system above may have configurations exemplified in FIGS. 8A-8B. A system configuration may include a second pre-coking hydrocracking reactor and optionally a second separator. Each of the two hydrocracking reactors may comprise, but are not limited to, a slurry phase reactor, an ebullated bed reactor, or a fixed bed reactor. The first of the two pre-coking hydrocracking reactors is preferably a slurry phase reactor that includes a liquid phase comprising the heavy oil feedstock and colloidal or molecular catalyst dispersed therein and a gaseous phase comprising mainly hydrogen. The separators may comprise one or more hot separators, distillation towers, fractionators, or any other separators known in the art, wherein the first of the two separators is preferably a hot separator. Additional variations of configurations based on the configurations of FIG. 1 can be devised by one skilled in the art according to the invention—combining hydrocracking reactions involving a molecular/colloidal catalyst with thermal cracking reactions of coking.

The embodiment shown in FIG. 8A adds a second pre-coking hydrocracking reactor 808 in the system after the first pre-coking hydrocracking reactor 804 and before the separator 812. The system comprises at least (1) a heavy oil feedstock 802 comprised of a substantial quantity of hydrocarbons having a boiling point greater than about 650° F. and a colloidal or molecular catalyst dispersed throughout the feedstock; (2) a pre-coking hydrocracking reactor 804 that heats or maintains the heavy oil feedstock 802 at a hydrocracking temperature together with hydrogen in order to convert at least a portion of higher boiling hydrocarbons in the heavy oil feedstock to lower boiling hydrocarbons and thereby form an upgraded material 806; (3) a second pre-coking hydrocracking reactor 808 that further upgrades the upgraded material 806 to form a further upgraded material 810 to be introduced into a separator 812; (4) the separator 812 separates gaseous and volatile fractions 816 from a liquid hydrocarbon fraction 814 in the further upgraded material 810; and (5) one or more coking systems 818 configured to receive and process the liquid hydrocarbon fraction 814 and to form and separate upgraded liquid hydrocarbon products 820 and coke 822.

The alternative embodiment shown in FIG. 8B adds a second pre-coking hydrocracking reactor 854 and a second separator 858 in the system between the first separator 848 and the coker 868. The second pre-coking hydrocracking reactor 858 upgrades the liquid hydrocarbon fraction 850 from the first separator 848 to form a further upgraded material 856 to be introduced into the second separator 858, which separates gaseous and volatile fractions 862 from a liquid hydrocarbon fraction 860 in the further upgraded material 856, which is then processed by the coker 868, yielding upgraded liquid hydrocarbon products 870 and coke 872.

Figure 9:
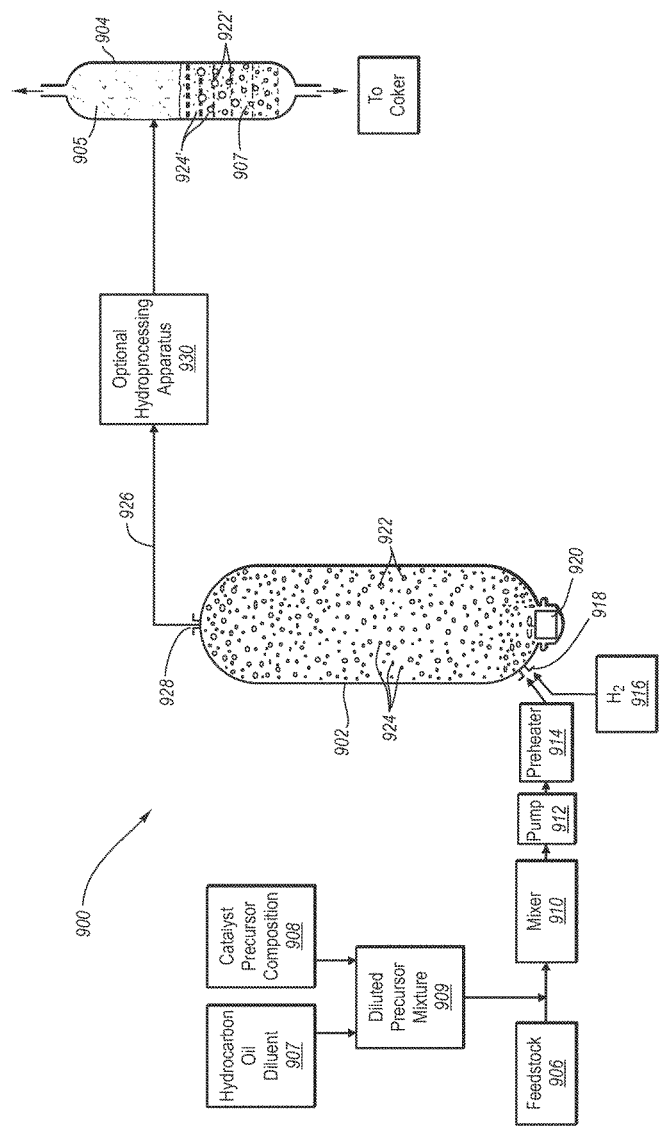
FIG. 9 is a schematic diagram of a two-phase pre-coking hydrocracking reactor employing a colloidal or molecular catalyst and a hot separator upstream of a coker according to the invention.

FIG. 9 schematically depicts a hydroprocessing system 900 that includes a two-phase slurry phase hydrocracking reactor 902 and a hot separator 904. A heavy oil feedstock 906 is blended and conditioned with a catalyst precursor 908 within a mixer 910, preferably after first pre-mixing the precursor composition 908 with a diluent 907 to form diluted precursor mixture 909. The conditioned feedstock from the mixer 910 is pressurized by a pump 912, which also serves as a multi-stage mixing device to further disperse the catalyst precursor composition as discussed above, passed through a pre-heater 914, and continuously fed into the reactor 902 together with hydrogen gas 916 through an input port 918 located at or near a bottom of the reactor 902. A stirrer 920 at the bottom of the reactor 902 induces mixing within the liquid phase, thus helping to more evenly disperse the heat generated by the hydrocracking reactions. Alternatively, or in addition to the stirrer 920, the reactor 902 may include a recycle channel, recycling pump, and distributor grid plate (not shown) as in conventional ebullated bed reactors (See FIG. 10) to promote more even dispersion of reactants, catalyst, and heat. Hydrogen is schematically depicted as gas bubbles 922, within the feedstock 306. The colloidal or molecular catalyst within the feedstock 906 is schematically depicted as catalyst particles 924. It will be appreciated that gas bubbles 922 and catalyst particles 924 are shown oversized so that they may be seen in the drawing.

The heavy oil feedstock 906 is catalytically upgraded in the presence of the hydrogen and colloidal or molecular catalyst within the slurry phase reactor 902 to form an upgraded feedstock 926, which is continuously withdrawn from the slurry phase reactor 902 through an output port 928 located at or near the top of the slurry phase reactor 902 and then fed into the separator 904, optionally after passing through optional hydroprocessing apparatus 930.

The upgraded feedstock 926 in hot separator 904 contains residual or molecular catalyst, schematically depicted as catalyst particles 924' within the hot separator 904, and residual hydrogen, schematically depicted as bubbles 922'. The hot separator 904, which may be operated at a temperature within about 20° F. (about 11° C.) of the hydrocracking temperature within the reactor 902, separates the volatile fraction 905, which is withdrawn from the top of hot separator 904, from the non-volatile liquid fraction 907, which is withdrawn from the bottom of hot separator 904. Beneficial upgrading reactions between hydrocarbon free radicals that still exist and/or are formed within non-volatile fraction 907 and residual hydrogen 922' can be catalyzed by residual colloidal or molecular catalyst 924' within the hot separator 904.

The liquid fraction 907 is withdrawn from the hot separator 904 and transferred to one or more coking reactors to form upgraded liquid hydrocarbon products and coke. The colloidal or molecular catalysts in the non-volatile fraction 907 may optionally be removed by a guard bed (not shown) containing a solid supported catalyst before introducing liquid fraction 907 into one or more coking reactors.

Figure 10:
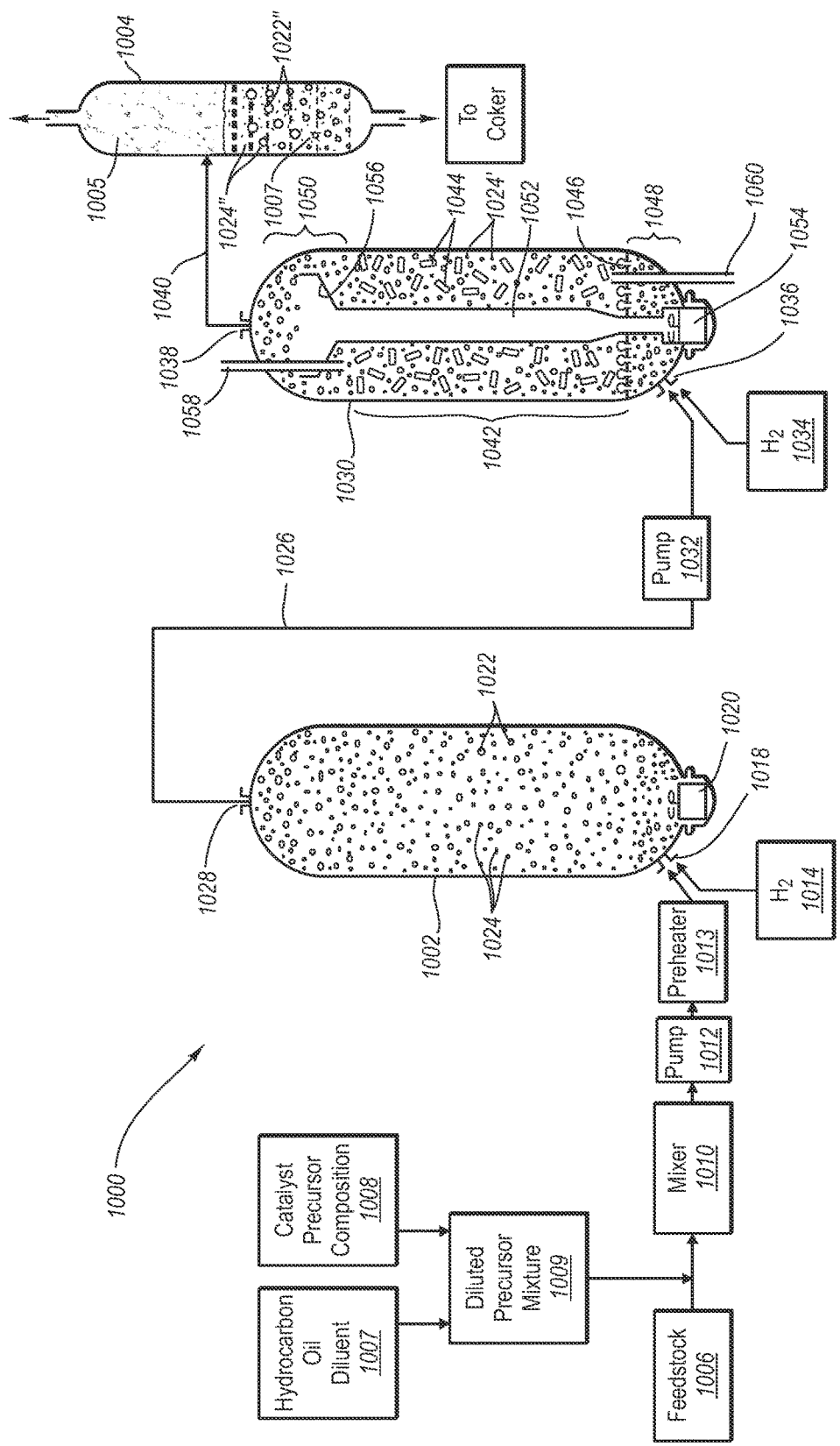
FIG. 10 is a schematic diagram of a two-phase pre-coking hydrocracking reactor, a three-phase ebullated bed pre-coking hydrocracking reactor, and a hot separator upstream of a coker according to the invention.

FIG. 10 schematically depicts a hydroprocessing system 1000 that includes a slurry phase hydrocracking reactor 1002, a hot separator 1004, and an ebullated bed reactor 1030 disposed between the slurry phase reactor 1002 and hot separator 1004. The slurry phase reactor 1002 produces an upgraded feedstock 1026 in essentially the same way as in hydroprocessing system 900, except that the upgraded feedstock 1026 is fed into the ebullated bed reactor 1030 instead of the hot separator 904. The upgraded feedstock 1026 is optionally pressurized by pump 1032 and introduced together with supplemental hydrogen 1034 into the ebullated bed reactor 1030 through an input port 1036 located at or near the bottom of the ebullated bed reactor 1030. The upgraded feedstock 1026 contains residual or molecular catalyst, schematically depicted as catalyst particles 1024' within the ebullated bed reactor 1030. The ebullated bed reactor 1030 also includes an output port 1038 at or near the top of the ebullated bed reactor 1030 through which a further hydroprocessed feedstock 1040 is withdrawn.

The ebullated bed reactor 1030 further includes an expanded catalyst zone 1042 comprising a porous supported catalyst 1044 that is maintained in an expanded or fluidized state against the force of gravity by upward movement of feedstock and gas through the ebullated bed reactor 1030. The lower end of the expanded catalyst zone 1042 is defined by a distributor grid plate 1046 with bubble caps, which separates the expanded catalyst zone 1042 from a lower supported catalyst free zone 1048 located between the bottom of the ebullated bed reactor 1030 and the distributor grid plate 1046. The distributor grid plate 1046 distributes the hydrogen gas and feedstock evenly across the reactor and prevents the supported catalyst 1044 from falling by the force of gravity into the lower supported catalyst free zone 1048. The upper end of the expanded catalyst zone 1042 is the height at which the downward force of gravity begins to equal or exceed the uplifting force of the upwardly moving feedstock and gas through the ebullated bed reactor 1030 as the supported catalyst 1044 reaches a given level of expansion or separation. Above the expanded catalyst zone 1042 is an upper supported catalyst free zone 1050. Residual colloidal or molecular catalyst 1024' is dispersed throughout the feedstock within the ebullated bed reactor 1030, including both the expanded catalyst zone 1022 and the supported catalyst free zones 1048, 1050.

Feedstock within the ebullated bed reactor 1030 continuously recirculates from the upper supported catalyst free zone 1050 to the lower supported catalyst free zone 1048 of the ebullated bed reactor 1030 by means of a recycling channel 1052 disposed in the center of the ebullated bed reactor 1030 in communication with an ebullating pump 1054 disposed at the bottom of the ebullated bed reactor 1030. At the top of the recycling channel 1052 is a funnel-shaped recycle cup 1056 through which feedstock is drawn from the upper supported catalyst free zone 1050. The feedstock drawn downward through the recycling channel 1052 enters the lower catalyst free zone 1048 and then passes up through the distributor grid plate 1046 and into the expanded catalyst zone 1042, where it is blended with fresh upgraded feedstock 1026 and supplemental hydrogen gas 1034 entering the ebullated bed reactor 1030 through the input port 1036. Continuously circulating blended feedstock upward through the ebullated bed reactor 1030 advantageously maintains the supported catalyst 1044 in an expanded or fluidized state within the expanded catalyst zone 1042, minimizes channeling, controls reaction rates, and keeps heat released by the exothermic hydrogenation reactions to a safe level.

Fresh supported catalyst 1044 is introduced into the ebullated bed reactor 1030, more specifically the expanded catalyst zone 1042, through a catalyst input tube 1058 that passes through the top or bottom of the ebullated bed reactor 1030 and directly into the expanded catalyst zone 1042. Spent supported catalyst 1044 is withdrawn from the expanded catalyst zone 1042 through a catalyst withdrawal tube 1060 that passes from a lower end of the expanded catalyst zone 1042 through both the distributor grid plate 1046 and the bottom of the ebullated bed reactor 1030. It will be appreciated that the catalyst withdrawal tube 1060 is unable to differentiate between fully spent catalyst, partially spent but active catalyst, and fresh catalyst such that a random distribution of supported catalyst 1044 is withdrawn from the ebullated bed reactor 1030 as "spent" catalyst. This has the effect of wasting a certain amount of the supported catalyst 1044. On the other hand, the existence of residual colloidal or molecule catalyst, schematically shown as catalyst particles 1024', within the ebullated bed reactor 1030, provides additional catalytic hydrogenation activity, both within the expanded catalyst zone 1042 and the lower and upper supported catalyst free zones 1048, 1050. Capping of free radicals minimizes formation of sediment and coke precursors, which are often responsible for deactivating the supported catalyst. This may have the effect of reducing the amount of supported catalyst 1044 that would otherwise be required to carry out a desired hydroprocessing reaction. It may also reduces the rate at which the supported catalyst 1044 must be withdrawn and replenished.

Then, the further hydroprocessed feedstock 1040 withdrawn from the ebullated bed reactor 1030 is introduced into the hot separator 1004. The hot separator 1004, which is advantageously operated at a temperature within about 20° F. (about 11° C.) of the hydroprocessing temperature within the ebullated bed reactor 1030, separates the volatile fraction 1005, which is withdrawn from the top of hot separator 1004, from the non-volatile fraction 1007, which is withdrawn from the bottom of hot separator 1004. The non-volatile fraction 1007 typically contains residual colloidal or molecular catalyst, schematically depicted as catalyst particles 1024", and residual hydrogen gas, schematically depicted as bubbles 1022", dispersed therein.

Finally, the non-volatile fraction 1007 can be withdrawn from the hot separator 1004 and transferred to one or more coking reactors to form upgraded liquid hydrocarbon products and coke.

Figure 11:
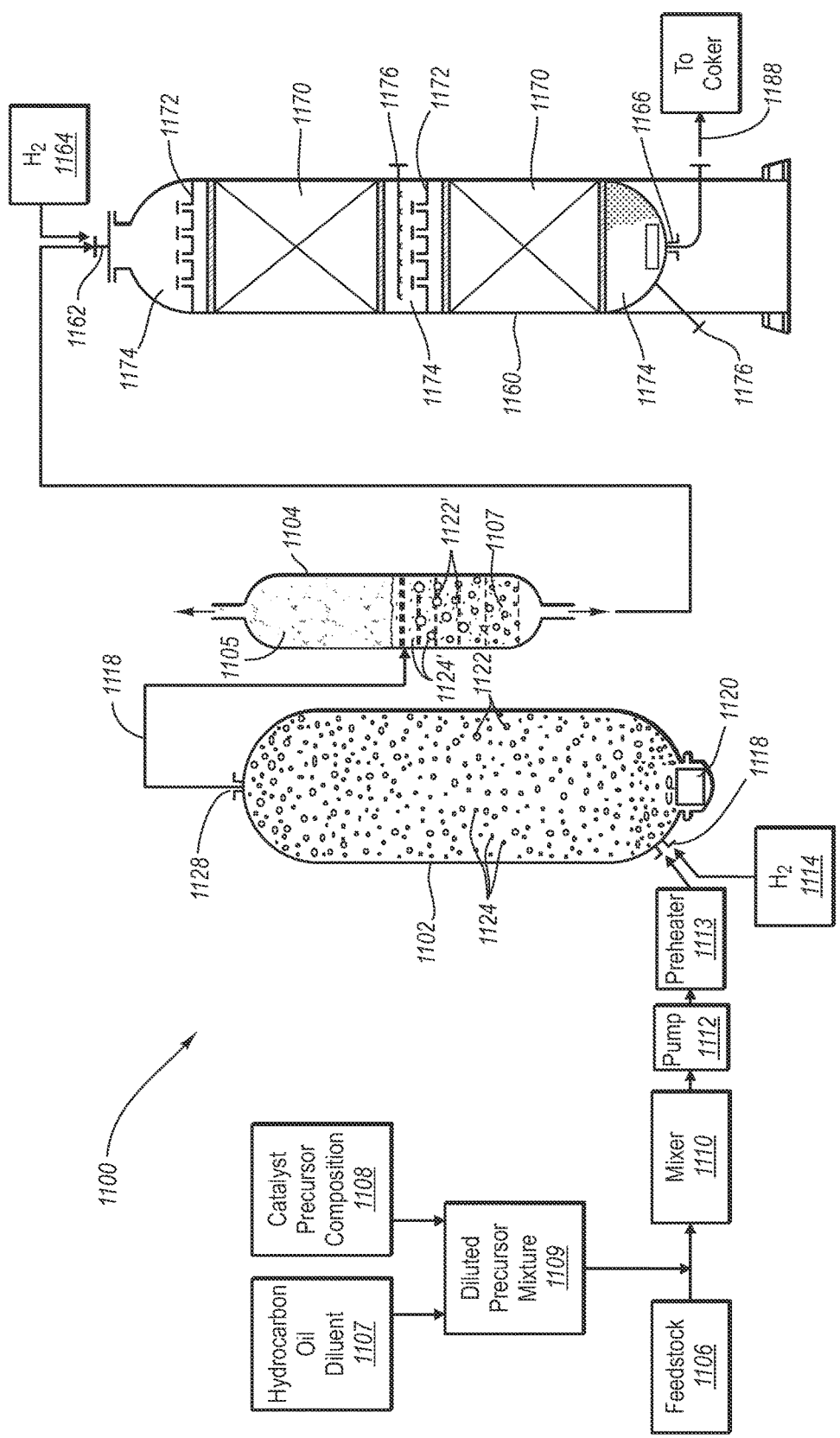
FIG. 11 is a schematic diagram of a two-phase pre-coking hydrocracking reactor, a hot separator, and a fixed bed pre-coking hydrocracking reactor upstream of a coker according to the invention.

FIG. 11 schematically depicts a hyproces sing system 1100 that includes a slurry phase reactor 1102, a hot separator 1104, and a fixed bed reactor 1160. The slurry phase reactor 1102 produces an upgraded feedstock 1118 in essentially the same way as the slurry phase reactor 902 in hydroprocessing system 900 (FIG. 9), and the hot separator 1104 separates a volatile fraction 1105 from a non-volatile fraction 1107 in essentially the same way as the hot separator 904 in hydroprocessing system 900. The upgraded feedstock 1118 contains residual colloidal or molecular catalyst, schematically depicted as catalyst particles 1124' within the hot separator 1104. The non-volatile fraction 1107 is, however, introduced into the fixed bed reactor 1160 for further hydroprocessing. The fixed bed reactor 1160 may be designed to perform hydrocracking and/or hydrotreating reactions depending on the operating temperature and/or the type of solid supported catalyst that is used within the fixed bed reactor 1160.

Fixed bed reactor 1160 more particularly includes an input port 1162 at the top through which the non-volatile fraction 1107 and supplemental hydrogen gas 1164 are introduced, and an output port 1166 at the bottom through which a further hydroprocessed feedstock 1188 is withdrawn. The fixed bed reactor 1160 further includes a plurality of vertically stacked and spaced apart catalyst beds 1170 comprising a packed porous supported catalyst. Above each catalyst bed 1170 is a distributor grid 1172, which helps to more evenly distribute the flow of feedstock downward through the catalyst beds 1170. Supported catalyst free zones 1174 exist above and below each catalyst bed 1170. To the extent the residual colloidal or molecular catalyst 1124' is not preliminarily removed by a guard bed, it remains dispersed throughout the feedstock within the fixed bed reactor 1160, in both the catalyst beds 1170 and the supported catalyst free zones 1174. Auxiliary ports 1176 in the center and/or bottom of the fixed bed reactor 1160 may be provided through which a cooling oil and/or hydrogen quench can be introduced to cool heat generated by the hydroprocessing reactions, control the reaction rate, and thereby help prevent formation of coke precursors and sediment and/or excessive gas within the fixed bed reactor 1160.

The further hydroprocessed feedstock 1188 is then withdrawn from the fixed bed reactor 1160, separated into volatile and nonvolatile fractions, the latter of which is transferred to one or more coking reactors that yields upgraded hydrocarbon products and coke, which are separated by the coking system for storage and further downstream processing.

III. Examples

The following examples describe test studies which demonstrate the effects and advantages of hydrocracking petroleum atmospheric or vacuum residues in a hydrocracking reactor using a colloidal or molecular catalyst followed by processing of the resultant residue in a coker, as compared to a conventional hydrocracking process or a conventional coking process.

The heavy oil feedstock used in the examples include: blend of 75 W % Cold Lake and 25 W % Athabasca vacuum residues, Black Rock atmospheric residue, Black Rock vacuum residue, Murphy vacuum residue, Ku vacuum residue, and Arab Medium vacuum residue.

The hydrocracking reactor process produces distillates, hydrocarbon gases, hydrogen sulfide and ammonia along with upgraded residues. The quantities and qualities of these products vary with feedstock, space velocity, hydrogen partial pressure and reaction temperature and catalyst concentration. The upgraded residue yields additional distillates when processed in the coker. The combined process of hydrocracking with the colloidal or molecular catalyst followed by coking of the hydrocracked residue produces significantly increased distillate yields over processing these feeds in either process independently.

It has been demonstrated that residue conversions as high as 83 wt % can be achieved by hydrocracking vacuum residue using the colloidal or molecular catalyst without coking. Without further processing of the residue, the resultant residue may be sold as low-value bunker fuel. Conversion by coking alone of this same feeds is expected to vary between 72 and 85 wt %. In each of the 18 examples shown below, the overall conversion of the combined process is higher than either hydrocracking or coking by itself. The overall conversion increase is estimated to be between 4.7 and 15.5 wt %.

Examples 1-5

Examples 1-5 are runs testing the hydroprocessing process as implemented by the invention using as feedstock a blend of 75 wt % Cold Lake and 25 wt % Athabasca vacuum residues. Table 1 shows the properties of the individual vacuum residues, and also of the 75/25 blend that was used for the test run.

TABLE 1

|  | Cold Lake Vacuum Resid | Athabasca Vacuum Resid | Blended Feed for Examples 1 to 5 (75 wt % Cold Lake/ 25 wt % Athabasca) |
|---|---|---|---|
| API Gravity | 1 | 1.7 |  |
| C (W %) | 82.9 | 82.12 | 82.71 |
| H (W %) | 9.77 | 9.64 | 9.74 |
| S (W %) | 5.72 | 6.51 | 5.92 |
| N (W %) | 0.8 | 0.82 | 0.81 |
| MCR (W %) | 22.5 | 23.1 | 22.65 |
| Initial Boiling Point (° F.) (by TBP Distillation) | 756.5 | 657.8 | 657.8 |
| Resid Content (as wt % of 975° F.+) (by TBP Distillation) | 86.44 | 87.08 | 86.6 |

The results for the pre-coking hydrocracking reactions are based on a pilot hydrocracking reactor implemented according to the invention, while the coking reaction results are based on a hypothetical coking system. The pilot hydrocracking reactor system consisted of two reactor stages, each with an internal volume of 2910 cc. Each stage was back-mixed using an external pumparound loop which continuously withdrew reactor liquid from near the top of the reactor and returned it to the bottom of the reactor. The reactors were operated as bubble column reactors, without the use of solid supported catalyst. Molybdenum 2-ethylhexanoate was used as the catalyst precursor, which was first blended with a diluent (vacuum gas oil) to generate a diluted catalyst precursor blend. This was then blended into the vacuum residue feedstock mixture described above. Quantities were adjusted so that the diluted catalyst precursor blend constituted 1% by weight of the total feed blend, and the catalyst precursor loading in the total feed blend was 150 ppm by weight (as Mo). This pre-blended feed mixture was then charged at regular intervals to a feed vessel, from which it was continuously pumped into the two-stage reactor system.

For each of the Examples 1 to 5, performance results are selected from a specific 24-hour period, which represents the $2^{nd}$ to $4^{th}$ day of operation on the respective condition, thereby ensuring that the results reflect lined-out unit operation. For these examples both reactor stages were maintained at a common temperature, which differed between examples as shown in Table 2. Other operating conditions were maintained at constant values for these examples. Liquid hourly space velocity was maintained at 0.37 volume fresh feed/reactor volume/hr, pressure was 2200 psig, and the hydrogen feed rate was 4800 scf/bbl fresh feed. For each example, the liquid products collected from the unit during the specified operating day were distilled using a true boiling point apparatus, to obtain yields and properties for product fractions. These results are shown in Table 2. Of particular note are the properties of the vacuum residue product fraction (975° F.+), which provides key data for the prediction of performance in the hypothetical downstream coking step, as discussed below.

To predict the performance of a downstream coking unit which would process the vacuum residue product fraction of each of the examples, a published correlation was used. This was obtained from the book "Process Chemistry of Petroleum Macromolecues" (I. A. Wiehe, CRC Press, $1^{st}$ ed., 2008). The theoretical (expected) coke make for a coking operation can be calculated using the following equation from page 351 of the reference:

$$A(100)=11.28(L)+3.8(100-L)$$

where A is the hydrogen content in the coker feed, 11.28 is the hydrogen content in the resultant coker derived liquid, 3.8 is the hydrogen content in the resultant coke, L is the weight percent of the coker feed which will become coker derived liquid.

Furthermore, page 390 of the abovementioned reference provides a table of expected liquid yields for various resid upgrading technologies. The three commercial coker technologies listed have liquid yields between 59 and 61%, and a fourth demonstrated coking technology is shown with a 66% liquid yield. Based on this data a 65% coker yield was used to calculate the liquid yield for the present examples.

On this basis, the performance characteristics of the combined hydrocracking and coking process of the present invention can be compared to those of individual processes. This is shown in Table 3. The conversion values represent the percentage by weight of hydrocarbons having a boiling point of at least 524° C. (975° F.) that are converted to hydrocarbons having a boiling point below 524° C. (975° F.). For each example, the conversion for each individual process (hydrocracking and coking) is shown alongside that of the combined process of the present invention. The column labeled Δ represents the improvement (in absolute percentage points) of the inventive process relative to the higher of the two individual processes. Notably, the combined process improves conversion rate by about 5 to 12% compared to the best conversion rate provided by either conventional thermal coking process or hydrocracking alone.

TABLE 2

|  | E. 1 | Ex. 2 | Ex. 3 | Ex. 4 | Ex. 5 |
| --- | --- | --- | --- | --- | --- |
| Run Data | | | | | |
| Operating Period (Day On-Stream) | 4 | 7 | 10 | 15 | 17 |
| Temperature, F. | 814 | 793 | 793 | 784 | 771 |
| Temperature, C. | 435 | 423 | 423 | 418 | 410 |
| Properties of Resid Product Fraction (975 F+), obtained from TBP Distillation | | | | | |
| API Gravity | −12 | −10.2 | −10.4 | −7.2 | −4.7 |
| C (W %) | 87 | 85.95 | 85.75 | 85.92 | 84.85 |
| H (W %) | 6.42 | 7.61 | 7.77 | 7.79 | 8.48 |
| S (W %) | 3.52 | 3.8 | 3.84 | 3.9 | 4.26 |
| N (W %) | 2.18 | 1.84 | 1.69 | 1.52 | 1.54 |
| MCR (W %) | 62.5 | 51.4 | 55.3 | 49 | 43.1 |
| Hydrogen Consumption (scf/bbl) | 939 | 1233 | 1371 | 1148 | 930 |
| 975° F.+ Conversion (ash free) (W %) | 72.46 | 76.51 | 79.66 | 72.95 | 62.51 |
| Asphaltene Conversion (HI-TI) (W %) | 72.91 | 78.89 | 80.15 | 75.34 | 69.76 |
| MCR Conversion (ash free) (W %) | 37.3 | 54.94 | 57.01 | 47.23 | 40.04 |
| C1-C3 Yield (W %) | 4.54 | 5.04 | 5.3 | 4.57 | 3.37 |
| C4-C7 Yield (W %) | 1.79 | 2.21 | 2.34 | 1.79 | 2.9 |
| C4-975 Yield (W %) | 68.35 | 71.76 | 74.26 | 69.28 | 61.6 |
| Resid Yield (975° F.+) (W %) | 23.85 | 20.33 | 17.61 | 23.42 | 32.46 |

TABLE 3

| Example | Conversion (W %) | | | | Coke Reduct. (%) | C4+ Yield (W %) | | | |
|---|---|---|---|---|---|---|---|---|---|
| | Hydro-cracking | Coking | Combined | Δ | | Hydro-cracking | Coking | Combined | Δ |
| 1 | 72.46 | 79.38 | 84.50 | 5.13 | 24.86 | 68.35 | 65.00 | 83.85 | 15.50 |
| 2 | 76.51 | 79.38 | 90.02 | 10.64 | 51.62 | 71.76 | 65.00 | 84.98 | 13.22 |
| 3 | 79.66 | 79.38 | 91.73 | 12.08 | 59.92 | 74.26 | 65.00 | 85.71 | 11.45 |
| 4 | 72.95 | 79.38 | 89.07 | 9.69 | 47.01 | 69.28 | 65.00 | 84.50 | 15.22 |
| 5 | 62.51 | 79.38 | 87.85 | 8.47 | 41.07 | 61.60 | 65.00 | 82.70 | 17.70 |

Similarly, the yields of $C_4+$ hydrocarbon distillates having a boiling point less than 975° F. are shown in Table 3 for both individual processes and the combined process of the present invention. For Examples 1 to 5, the combined process improves the $C_4+$ distillate yield by 11.45-17.7 absolute percentage points, as compared to the best $C_4+$ distillate yield obtained by either process individually. Complementary to the conversion rate and $C_4+$ yield results, the combined hydrocracking and thermal cracking process substantially reduces coke formation, lowering coke formation by 24.86-59.92%.

Example 6-9

Examples 6-9 were conducted in similar fashion to the abovementioned examples, with hydrocracking tests conducted in a continuous-flow pilot unit, and coking performance predicted using the methods of the cited literature reference. For these examples, several different feedstock compositions were tested. For Example 6, Black Rock atmospheric residue was tested. Examples 7 and 8 utilized Black Rock vacuum residue. Example 9 used Murphy vacuum residue. The properties of each of these feed materials are summarized in Table 4.

TABLE 4

| | Black Rock Atmospheric Residue | Black Rock Vacuum Residue Examples | Murphy Vacuum Residue |
|---|---|---|---|
| | 6 | 7 and 8 | 9 |
| API Gravity | 6.7 | 1.4 | 0.6 |
| C (W %) | 81.27 | 80.32 | 80.44 |
| H (W %) | 10.12 | 9.26 | 9.35 |
| S (W %) | 7.29 | 8.8 | 8.6 |
| N (W %) | 0.64 | 0.87 | 0.81 |
| MCR (W %) | 13.87 | 26.55 | 24.21 |
| Initial Boiling Point (° F.) (by TBP Distillation) | 412 | n/a | n/a |
| Resid Content (as wt % of 975° F.+) (by TBP Distillation) | 59.24 | 95.26 | 91.05 |

Test conditions for Examples 6-9 differed in several respects from those in the earlier examples. The hydrocracking test unit consisted of only a single reactor stage of 2910 cc internal volume. In addition to changes in temperature between the individual examples, there were also variations in pressure, liquid hourly space velocity, hydrogen feed rate, and catalyst concentration; these are shown by condition in Table 5. Table 5 also shows the hydrocracking performance results for each of the examples.

TABLE 5

| | Ex. 6 | Ex. 7 | Ex. 8 | Ex. 9 |
|---|---|---|---|---|
| Run Data | | | | |
| Operating Period (Day On-Stream) | 9 | 18 | 24 | 28 |
| Temperature (° F.) | 806 | 833 | 819 | 818 |
| Temperature (° C.) | 430 | 445 | 437 | 437 |
| Pressure (psig) | 2000 | 2400 | 2400 | 2400 |
| LHSV (vol fresh feed/vol reactor/hr) | 0.8 | 0.39 | 0.39 | 0.39 |
| Hydrogen Feed (scf/bbl fresh feed) | 3999 | 5697 | 5098 | 5142 |
| Catalyst Concentration (ppmw as Mo) | 65 | 250 | 175 | 225 |
| Properties of Resid Product Fraction (975 F+), obtained from TBP Distillation | | | | |
| API Gravity | −11.6 | −9.3 | −6.8 | −9 |
| C (W %) | 83.91 | 84.54 | 84.37 | 84.68 |
| H (W %) | 7.67 | 7.54 | 7.91 | 7.69 |
| S (W %) | 5.73 | 4.67 | 5.14 | 4.51 |
| N (W %) | 1.32 | 1.62 | 1.38 | 1.47 |
| MCR (W %) | 39.09 | 54.09 | 48.52 | 45.24 |
| Hydrocracking Process Performance | | | | |
| Hydrogen Consumption (scf/bbl) | 667 | 1973 | 1453 | 1718 |
| 975° F.+ Conversion (ash free) (W %) | 61.53 | 82.77 | 73.28 | 79.75 |
| Asphaltene Conversion (HI-TI) (W %) | 58.47 | 78.3 | 69.36 | 78.56 |
| MCR Conversion (ash free) (W %) | 36.89 | 62.88 | 52.58 | 65.04 |
| Yields, moisture and ash-free fresh feed basis | | | | |
| C1-C3 Yield (W %) | 3.04 | 7.2 | 5.7 | 7.02 |
| C4-C7 Yield (W %) | 1.6 | 3.5 | 2.96 | 2.93 |
| C4-975 Yield (W %) | 71 | 71.43 | 64.22 | 69.38 |
| Resid Yield (975° F.+) (W %) | 22.28 | 16.01 | 24.82 | 18.36 |

Similar to the previous examples, the performance of a downstream coking unit was predicted for Examples 6 to 9 based on the results of hydrocracking tests in Table 5 and the coking correlation obtained from the literature. Table 6 shows the results, comparing the 524° C.+(975° F.+) vacuum residue conversion for the individual processes (hydrocracking and coking) to that of the combined process of the present invention. The combined process improves conversion rate by 4.76 to 15.54 absolute percentage points compared to the best conversion rate obtained by either coking or hydrocracking individually.

TABLE 6

| Example | Conversion (W %) | | | | Coke Reduct. (%) | C4+ Yield (W %) | | | |
|---|---|---|---|---|---|---|---|---|---|
| | Hydro-cracking | Coking | Combined | Δ | | Hydro-cracking | Coking | Combined | Δ |
| 6 | 61.53 | 84.49 | 89.25 | 4.76 | 30.67 | 72.60 | 65.00 | 87.08 | 14.48 |
| 7 | 82.77 | 72.99 | 92.00 | 9.23 | 70.36 | 74.92 | 65.00 | 85.33 | 10.41 |
| 8 | 73.28 | 72.99 | 88.82 | 15.54 | 58.59 | 67.18 | 65.00 | 83.31 | 16.14 |
| 9 | 79.75 | 74.20 | 91.19 | 11.44 | 65.84 | 72.32 | 65.00 | 84.25 | 11.94 |

Similarly, the C4+ distillate yield is compared between the individual processes and the combined process of the present invention. The combined process improves C4+ distillate yield by 10.41-16.14 percentage points, as compared to the best $C_4$+ distillate yield by either process individually. Complementary to the conversion rate and C4+ yield results, the process combining hydrocracking and thermal cracking substantially reduces coke formation, lowering coke formation by 30.67-70.36%.

Example 10-13

Examples 10 to 13 were conducted in a fashion similar to the previous examples. In this case, all examples used a Ku 850° F.+ vacuum residue, the properties of which are shown in Table 7.

TABLE 7

| | Ku 850° F.+ Vacuum Residue Examples 10 to 13 |
|---|---|
| API Gravity | 3 |
| C (W %) | 82.31 |
| H (W %) | 9.64 |
| S (W %) | 6.11 |
| N (W %) | 1.02 |
| MCR (W %) | 25.41 |
| Initial Boiling Point (° F.) (by D-1160 Distillation) | 694 |
| Resid Content (as wt % of 975° F.+) (by D-1160 Distillation) | 82.23 |

For Examples 10-13, the hydrocracking pilot unit consisted of a single reactor stage of 2910 cc internal volume. Most operating conditions were maintained at constant levels for these examples, with reactor temperature at 815° F. (435° C.), pressure at 2500 psig, hydrogen feed rate at 5600 scf/bbl fresh feed, and liquid hourly space velocity at 0.35 volume fresh feed/volume reactor/hr. The only difference between these examples is the catalyst concentration, which ranged from 51 to 508 ppm by weight (as Mo), as shown in Table 8.

TABLE 8

| | Ex. 10 | Ex. 11 | Ex. 12 | Ex. 13 |
|---|---|---|---|---|
| Run Data | | | | |
| Operating Period (Day On-Stream) | 4 | 9 | 13 | 16 |
| Catalyst Concentration (ppmw as Mo) | 153 | 153 | 508 | 51 |

TABLE 8-continued

| | Ex. 10 | Ex. 11 | Ex. 12 | Ex. 13 |
|---|---|---|---|---|
| Properties of Resid Product Fraction (975 F+), obtained from TBP Distillation | | | | |
| API Gravity | −8.1 | −8.1 | −8.5 | −9.1 |
| C (W %) | 84.68 | 84.94 | 84.65 | 84.84 |
| H (W %) | 7.81 | 7.68 | 7.85 | 7.66 |
| S (W %) | 4.55 | 4.81 | 4.25 | 4.46 |
| N (W %) | 1.36 | 1.44 | 1.46 | 1.32 |
| MCR (W %) | 50.95 | 53.79 | 53.58 | 51.98 |
| Hydrocracking Process Performance | | | | |
| Hydrogen Consumption (scf/bbl) | 1685 | 1656 | 1605 | 1632 |
| 975° F.+ Conversion (ash free) (W %) | 75.3 | 74.55 | 75.16 | 74.86 |
| Asphaltene Conversion (HI-TI) (W %) | 76.03 | 74.89 | 78.85 | 72.05 |
| MCR Conversion (ash free) (W %) | 53.89 | 53.65 | 53.72 | 53.67 |
| Yields, moisture and ash-free fresh feed basis | | | | |
| C1-C3 (W %) | 7.33 | 7.26 | 6.86 | 7.21 |
| C4-350° F. (W %) | 16.48 | 16.67 | 16.72 | 17.28 |
| 350-650° F. (W %) | 26.12 | 26.44 | 26.7 | 26.57 |
| 650-975° F. (W %) | 26.65 | 25.58 | 26.06 | 24.94 |
| Resid Yield 975° F.+ (W %) | 20.3 | 20.92 | 20.42 | 20.66 |

Table 8 also shows the performance results for the hydrocracking process, including the properties of the vacuum residue product fraction (975F+), the process residue conversion, and the yields of product fractions. As was done for the previous examples, the performance of a downstream coking process was then predicted using the correlation obtained from the abovementioned literature reference, allowing the performance of the individual processes (hydrocracking and coking) to be compared to that of the combined process of the present invention. Results are shown in Table 9. For the vacuum residue conversion, the combined process increases conversion by 11.85 to 15.54 percentage points compared to the best result obtained from either individual process.

TABLE 9

| Example | Conversion (W %) | | | | Coke Reduct. (%) | C4+ Yield (W %) | | | |
|---|---|---|---|---|---|---|---|---|---|
| | Hydro-cracking | Coking | Combined | Δ | | Hydro-cracking | Coking | Combined | Δ |
| 10 | 75.30 | 78.07 | 90.58 | 12.51 | 57.04 | 69.25 | 65.00 | 82.44 | 13.20 |
| 11 | 74.55 | 78.07 | 89.93 | 11.85 | 54.07 | 68.70 | 65.00 | 82.30 | 13.60 |
| 12 | 75.16 | 78.07 | 90.64 | 12.56 | 57.3 | 69.48 | 65.00 | 82.75 | 13.27 |
| 13 | 74.86 | 78.07 | 90.00 | 11.93 | 54.39 | 68.79 | 65.00 | 82.23 | 13.43 |

Similarly, the C4+ distillate yield is shown for the individual processes and the combined process of the present invention. The combined process improves C4+ distillate yield by 13.27-13.60 percentage points, as compared to the best result obtained from either process individually. Complementary to the conversion rate and C4+ yield results, the process combining hydrocracking and thermal cracking substantially reduces coke formation, lowering coke formation by 54.07-57.3%.

Example 14-18

Examples 14 to 18 were conducted in similar fashion to the previous examples. In this case, the feedstock was Arab Medium vacuum residue, the properties of which are shown in Table 10.

TABLE 10

| | Arab Medium Vacuum Residue Examples 14 to 18 |
|---|---|
| API Gravity | 6.48 |
| C (W %) | 83.1 |

TABLE 10-continued

| | Arab Medium Vacuum Residue Examples 14 to 18 |
|---|---|
| H (W %) | 10.04 |
| S (W %) | 5.07 |
| N (W %) | 0.67 |
| MCR (W %) | 17.21 |
| Initial Boiling Point (° F.) (by D-1160 Distillation) | 522 |
| Resid Content (as wt % of 1000° F.+) (by D-1160 Distillation) | 92.65 |

For Examples 14 to 18, the hydrocracking pilot unit consisted of a two reactor stages of 2910 cc internal volume each. For these examples, reactor temperature was maintained at 803° F. (428° C.) and pressure at 2250 psig. Other conditions were varied as shown in Table 11.

TABLE 11

| | Ex. 14 | Ex. 15 | Ex. 16 | Ex. 17 | Ex. 18 |
|---|---|---|---|---|---|
| Run Data | | | | | |
| Operating Period (Day On-Stream) | 4 | 10 | 14 | 27 | 32 |
| LHSV (vol fresh feed/vol reactor/hr) | 0.39 | 0.29 | 0.22 | 0.29 | 0.29 |
| Hydrogen Feed (scf/bbl fresh feed) | 4511 | 4513 | 4704 | 4515 | 4505 |
| Catalyst Concentration (ppmw as Mo) | 149 | 149 | 149 | 298 | 50 |
| Properties of Resid Product Fraction (975 F+), obtained from TBP Distillation | | | | | |
| API Gravity | −2.2 | −6.3 | −7.7 | −3.9 | −5.6 |
| C (W %) | 84.52 | 85.3 | 85.04 | 85.98 | 85 |
| H (W %) | 8.72 | 8.3 | 7.83 | 8.54 | 8.24 |
| S (W %) | 4.32 | 4.25 | 3.99 | 3.85 | 4.49 |
| N (W %) | 1.41 | 1.58 | 1.63 | 1.3 | 1.62 |
| MCR (W %) | 41.53 | 47.46 | 42.04 | 45.33 | 42.46 |
| Hydrocracking Process Performance | | | | | |
| Hydrogen Consumption (scf/bbl) | 838 | 1021 | 1386 | 1249 | 1149 |
| 1000° F.+ Conversion (ash free) (W %) | 63.13 | 73.4 | 80.74 | 73.44 | 73.68 |
| Asphaltene Conversion (HI-TI) (W %) | 37.8 | 49.14 | 56.66 | 55.65 | 42.84 |
| MCR Conversion (ash free) (W %) | 15.84 | 29.28 | 38.1 | 29.07 | 30.76 |
| Yields, moisture and ash-free fresh feed basis | | | | | |
| C1-C3 (W %) ff | 3.47 | 5 | 6.35 | 5.04 | 5.17 |
| C4-650° F. (W %) ff | 31.29 | 39.68 | 48.31 | 40.01 | 41.93 |
| 650-1000° F. (W %) ff | 28.72 | 27.78 | 24.76 | 27.7 | 25.97 |
| Resid Yield 1000° F.+ (W %) ff | 34.33 | 24.77 | 17.93 | 24.73 | 24.51 |

Table 11 also shows the performance results for the hydrocracking process, including the properties of the vacuum residue product fraction (1000° F.+), the process residue conversion, and the yields of product fractions. As was done for the previous examples, the performance of a downstream coking process was then predicted using the correlation obtained from the abovementioned literature reference, allowing the performance of the individual processes (hydrocracking and coking) to be compared to that of the combined process of the present invention. Results are shown in Table 12. For the vacuum residue conversion, the combined process improves conversion rate by 4.83 to 8.31 percentage points compared to the best result obtained from either process individually.

TABLE 12

| Example | Conversion (W %) | | | | Coke Reduct. (%) | C4+ Yield (W %) | | | |
|---|---|---|---|---|---|---|---|---|---|
| | Hydro-cracking | Coking | Combined | Δ | | Hydro-cracking | Coking | Combined | Δ |
| 14 | 63.13 | 83.42 | 88.25 | 4.83 | 29.12 | 60.01 | 65.00 | 82.33 | 17.33 |
| 15 | 73.40 | 83.42 | 90.13 | 6.71 | 40.47 | 67.46 | 65.00 | 83.56 | 16.10 |
| 16 | 80.74 | 83.42 | 91.73 | 8.31 | 50.1 | 73.07 | 65.00 | 84.73 | 11.66 |
| 17 | 73.44 | 83.42 | 90.94 | 7.52 | 45.35 | 67.71 | 65.00 | 83.78 | 16.08 |
| 18 | 73.68 | 83.42 | 90.04 | 6.62 | 39.91 | 67.90 | 65.00 | 83.83 | 15.93 |

Similarly, the C4+ distillate yield is compared between the individual processes and the combined process of the present invention. The combined process improves C4+ distillate yield by 11.66-17.33 percentage points, as compared to the best yield provided by either process individually. Complementary to the conversion rate and C4+ yield results, the process combining hydrocracking and thermal cracking substantially reduces coke formation, lowering coke formation by 29.12-45.35%.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for hydroprocessing a heavy oil feedstock to increase production of upgraded liquid hydrocarbon products and reduce coke formation, the method comprising:
   preparing a heavy oil feedstock comprised of a substantial quantity of hydrocarbons having a boiling point greater than about 343° C. (650° F.), including asphaltenes or other coke forming precursors, and a colloidal or molecular catalyst formed in situ within and dispersed throughout the heavy oil feedstock;
   introducing the heavy oil feedstock and hydrogen into a pre-coking hydrocracking reactor;
   hydrocracking the heavy oil feedstock at hydrocracking conditions to cause fragmentation of larger hydrocarbon molecules into smaller molecular fragments having a fewer number of carbon atoms and form hydrocarbon free radicals from the heavy oil feedstock, the colloidal or molecular catalyst catalyzing upgrading reactions between hydrogen and the hydrocarbon free radicals to yield an upgraded material, the upgrading reactions reducing the quantity of asphaltenes or other coke forming precursors by at least 20%, increasing the hydrogen to carbon ratio in the upgraded material, and decreasing the boiling points of hydrocarbons in the upgraded material compared to the heavy oil feedstock;
   transferring the upgraded material, together with residual colloidal or molecular catalyst and hydrogen, to a separator to separate gaseous and volatile fractions from a liquid hydrocarbon fraction, the liquid hydrocarbon fraction comprising residual catalyst metal;
   introducing at least a portion of the liquid hydrocarbon fraction and residual catalyst metal into one or more coking reactors and causing thermal-cracking of the liquid hydrocarbon fraction to form upgraded hydrocarbon products and coke;
   separating the coke from the upgraded hydrocarbon products; and
   further processing the upgraded hydrocarbon products to form further processed hydrocarbons and without recycling any further processed hydrocarbons to the hydrocracking reactor.

2. The method as in claim 1, wherein the separator comprises a hot separator.

3. The method as in claim 1, wherein the separator comprises a distillation tower.

4. The method as in claim 1, wherein the separator comprises a hot separator and a distillation tower.

5. The method as in claim 1, wherein the portion of the liquid hydrocarbon fraction introduced into the coking reactor comprises a vacuum reduced crude.

6. The method as defined in claim 1, the pre-coking hydrocracking reactor comprising at least one of a slurry phase reactor, an ebullated bed reactor, or a fixed bed reactor.

7. The method as in 1, wherein the pre-coking hydrocracking reactor is a slurry phase reactor including (i) an inlet port at a bottom of the slurry phase reactor into which the heavy oil feedstock and hydrogen are introduced and (ii) an outlet port at a top of the slurry phase reactor from which the upgraded material, colloidal or molecular catalyst, and hydrogen are withdrawn.

8. The method as defined in claim 7, the slurry phase reactor further comprising a recycle channel, a recycling pump, and a distributor grid plate.

9. The method as in claim 1, wherein the one or more coking reactors comprise one or more delayed coking reactors, fluid coking reactors, or Flexicoking® reactors.

10. The method as defined in claim 1, wherein the heavy oil feedstock comprises at least about 10 wt % asphaltenes or other coke forming precursors.

11. The method as in claim 1, the upgrading reactions reducing the quantity of asphaltenes or other coke forming precursors by at least 40 wt %.

12. The method as in claim 1, the upgrading reactions reducing the quantity of asphaltenes or other coke forming precursors by at least 60 wt %.

13. The method as in claim 1, the method converting at least 60 wt % of hydrocarbons having a boiling point of at least 524° C. (975° F.).

14. The method as in claim 1, the method converting at least 70 wt % of hydrocarbons having a boiling point of at least 524° C. (975° F.).

15. The method as in claim 1, the method converting at least 80 wt % of hydrocarbons having a boiling point of at least 524° C. (975° F.).

16. The method as in claim 1, wherein the method converts at least 85 wt % of hydrocarbons having a boiling point of at least 524° C. (975° F.).

17. The method as in claim 1, wherein the method yields at least 80 wt % of C4+hydrocarbons and a boiling point of less than about 524° C. (975° F.).

18. The method as in claim 1, wherein the method reduces coke formation by at least 25 wt % compared to coking in the absence of hydrocracking catalyzed by the molecular or colloidal catalyst.

19. The method as defined in claim 1, the colloidal or molecular catalyst in the heavy oil feedstock being formed by:
mixing a hydrocarbon oil diluent and an oil soluble catalyst precursor at a temperature below which a significant portion of the catalyst precursor starts to decompose to form a diluted precursor mixture;
mixing the diluted precursor mixture with a heavy oil feedstock in a manner so as to yield a conditioned feedstock that forms the colloidal or molecular catalyst upon decomposing the catalyst precursor and allowing metal liberated therefrom to react with sulfur liberated from the feedstock; and
heating the conditioned feedstock so as to decompose the catalyst precursor and allow metal liberated from the decomposed catalyst precursor to react with sulfur liberated from the heavy oil feedstock so as to form the colloidal or molecular catalyst.

20. The method as defined in claim 19, the hydrocarbon oil diluent comprising at least one of vacuum gas oil, decant oil, cycle oil, or light gas oil.

21. The method as defined in claim 19, the catalyst precursor comprising at least one transition metal and at least one organic moiety comprising or derived from 3-cyclopentylpropionic acid, cyclohexanebutyric acid, biphenyl-2-carboxylic acid, 4-heptylbenzoic acid, 5-phenylvaleric acid, geranic acid, 10-undecenoic acid, dodecanoic acid, octanoic acid, 2-ethylhexanoic acid, naphthanic acid, pentacarbonyl, or hexacarbonyl.

22. The method as defined in claim 21, the at least one transition metal comprising one or more of Mo, Ni, Co, W, V or Fe.

23. The method as defined in claim 19, the catalyst precursor comprising at least one of molybdenum 3-cyclopentylpropionate, molybdenum cyclohexanebutanoate, molybdenum biphenyl-2-carboxylate, molybdenum 4-heptylbenzoate, molybdenum 5-phenylpentanoate, molybdenum geranate, molybdenum 10-undecenoate, molybdenum dodecanoate, molybdenum 2-ethylhexanoate, molybdenum naphthanate, molybdenum hexacarbonyl, vanadium octoate, vanadium naphthanate, or iron pentacarbonyl.

24. The method as defined in claim 19, the ratio of catalyst precursor composition to hydrocarbon oil diluent being in a range of about 1:100 to about 1:5.

25. The method as defined in claim 19, the hydrocarbon oil diluent and catalyst precursor composition being mixed at temperature in a range of about 25° C. to about 250° C., the diluted precursor mixture and heavy oil feedstock being mixed at a temperature in a range of about 25° C. to about 350° C., and the conditioned feedstock being heated to a temperature in a range of about 275° C. to about 375° C.

26. The method as defined in claim 19, the hydrocarbon oil diluent and catalyst precursor composition being mixed at temperature in a range of about 75° C. to about 150° C., the diluted precursor mixture and heavy oil feedstock being mixed at a temperature in a range of about 75° C. to about 250° C., and the conditioned feedstock being heated to a temperature in a range of about 310° C. to about 360° C.

27. The method as defined in claim 19, the hydrocarbon oil diluent and catalyst precursor composition being mixed for a time period in a range of about 1 second to about 20 minutes, and the diluted precursor mixture and heavy oil feedstock being mixed for a time period in a range of about 1 second to about 20 minutes.

28. The method as defined in claim 19, the hydrocarbon oil diluent and catalyst precursor composition being mixed for a time period in a range of about 20 seconds to about 3 minutes, and the diluted precursor mixture and heavy oil feedstock being mixed for a time period in a range of about 20 seconds to about 5 minutes.

29. The method as defined in claim 1, further comprising processing the upgraded hydrocarbon products downstream from the pre-coking hydrocracking reactor and the one or more coking reactors.

30. A method for hydroprocessing a heavy oil feedstock to increase production of upgraded liquid hydrocarbon products and reduce coke formation, the method comprising:
preparing a heavy oil feedstock comprised of a substantial quantity of hydrocarbons having a boiling point greater than about 343° C. (650° F.) and including asphaltenes, and a colloidal or molecular catalyst formed in situ within and dispersed throughout the heavy oil feedstock, wherein the heavy oil feedstock is selected from the group consisting of heavy crude oil, oil sand bitumen, atmospheric tower bottoms, vacuum tower bottoms, resid, visbreaker bottoms, coal tar, heavy oil from oil shale, and liquefied coal, with the proviso that the heavy oil feedstock does not comprise coker gas oil;
introducing the heavy oil feedstock and hydrogen into a pre-coking hydrocracking reactor;
hydrocracking the heavy oil feedstock at hydrocracking conditions to cause fragmentation of at least some of the asphaltenes and to form hydrocarbon free radicals from the heavy oil feedstock, the colloidal or molecular catalyst catalyzing upgrading reactions between hydrogen and the hydrocarbon free radicals to yield an upgraded material, the upgrading reactions reducing the quantity of asphaltenes by at least 20%, increasing the hydrogen to carbon ratio in the upgraded material, and decreasing the boiling points of hydrocarbons in the upgraded material compared to the heavy oil feedstock;
transferring the upgraded material, together with residual colloidal or molecular catalyst and hydrogen, to a separator to separate gaseous and volatile fractions from a liquid hydrocarbon fraction, the liquid hydrocarbon fraction comprising residual catalyst metal;
introducing at least a portion of the liquid hydrocarbon fraction and residual catalyst metal into one or more coking reactors and causing thermal-cracking of the liquid hydrocarbon fraction to form upgraded hydrocarbon products and coke;
separating the coke from the upgraded hydrocarbon products, the upgraded hydrocarbon products including coker gas oil; and
further processing an entirety of the upgraded hydrocarbon products, including the coker gas oil, downstream from the pre-coking hydrocracking reactor to form one or more further processed hydrocarbons.

31. The method as defined in claim 30, wherein the heavy oil feedstock consists essentially of heavy crude oil, oil sand bitumen, atmospheric tower bottoms, vacuum tower bottoms, resid, visbreaker bottoms, coal tar, heavy oil from oil shale, or liquefied coal.

32. The method as in claim 30, the upgrading reactions reducing the quantity of asphaltenes by at least 40 wt %.

33. The method as in claim 30, the upgrading reactions reducing the quantity of asphaltenes by at least 60 wt %.

34. The method as in claim 1, wherein the heavy oil feedstock comprises at least one of heavy crude oil, oil sand bitumen, atmospheric tower bottoms, vacuum tower bottoms, resid, visbreaker bottoms, coal tar, heavy oil from oil shale, or liquefied coal.

35. The method as in claim 1, wherein the hydrocracking temperature is in a range of about 395° C. to about 460° C., the upgrading reactions reducing the quantity of asphaltenes or other coke forming precursors by at least 20 wt %.

36. The method as in claim 30, wherein the hydrocracking temperature is in a range of about 395° C. to about 460° C., the upgrading reactions reducing the quantity of asphaltenes or other coke forming precursors by at least 20 wt %.

* * * * *

UNITED STATES PATENT AND TRADEMARK OFFICE
CERTIFICATE OF CORRECTION

PATENT NO. : 9,644,157 B2
APPLICATION NO. : 13/561479
DATED : May 9, 2017
INVENTOR(S) : Harris et al.

It is certified that error appears in the above-identified patent and that said Letters Patent is hereby corrected as shown below:

In the Specification

Column 2
Line 36 and after, change all instances of "hydroproces sing" to --hydroprocessing--

Column 9
Lines 57-58, change "both type of reactors" to --both types of reactors--

Column 13
Lines 25-26, change "top of 232" to --top of the separator 232--

Column 23
Line 17, change "feedstock 306" to --feedstock 906--

Column 26
Line 34, change "same feeds is" to --same feed is--

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*